US012231942B2

(12) United States Patent
Xu et al.

(10) Patent No.: US 12,231,942 B2
(45) Date of Patent: *Feb. 18, 2025

(54) METHODS OF MEASUREMENT IN SDT

(71) Applicant: APPLE INC., Cupertino, CA (US)

(72) Inventors: Fangli Xu, Beijing (CN); Dawei Zhang, Saratoga, CA (US); Haijing Hu, Los Gatos, CA (US); Naveen Kumar R Palle Venkata, San Diego, CA (US); Ralf Rossbach, Munich (DE); Sarma V. Vangala, Campbell, CA (US); Sethuraman Gurumoorthy, San Ramon, CA (US); Srirang A. Lovlekar, Fremont, CA (US); Yuqin Chen, Beijing (CN); Zhibin Wu, Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,423

(22) Filed: Oct. 25, 2023

(65) Prior Publication Data
US 2024/0056867 A1 Feb. 15, 2024

Related U.S. Application Data

(63) Continuation of application No. 17/593,227, filed as application No. PCT/CN2021/085054 on Apr. 1, 2021, now Pat. No. 12,058,548.

(51) Int. Cl.
*H04W 24/10* (2009.01)
*H04W 74/0833* (2024.01)
*H04W 76/28* (2018.01)
(52) U.S. Cl.
CPC ....... *H04W 24/10* (2013.01); *H04W 74/0833* (2013.01); *H04W 76/28* (2018.02)

(58) Field of Classification Search
CPC .. H04W 24/10; H04W 74/0833; H04W 76/28
See application file for complete search history.

(56) References Cited

U.S. PATENT DOCUMENTS

2020/0374731 A1   11/2020   Hapsari et al.
2021/0315049 A1   10/2021   Wei et al.
(Continued)

FOREIGN PATENT DOCUMENTS

WO   2019202664 A1   10/2019
WO   2020191059 A1   9/2020

OTHER PUBLICATIONS

Apple, "Control plane aspects on the SDT procedure", R2-2101369, 3GPP TSG-RAN WG2 Meeting #113-e, E-meeting, Agenda Item 8.6.3, Jan. 25- Feb. 5, 2021, 7 pages.
(Continued)

*Primary Examiner* — Basil Ma
(74) *Attorney, Agent, or Firm* — Dorsey & Whitney LLP

(57) ABSTRACT

Systems and methods for performing measurements of one or more cells during an small data transmission (SDT) procedure between a user equipment (UE) and a network when the UE is in a radio resource control (RRC) INACTIVE state are described herein. Beam and/or cell measurements taken during an SDT measurement period of the SDT procedure may be used to determine one or more respective cell qualities, among other possibilities. Beginnings and endings of the SDT measurement period, and the manner (timing) for taking measurements within the SDT measurement period, are also described. The cell qualities so determined can then be used to monitor, during the SDT measurement period, for a measurement event, which causes the UE to send a measurement report to the network having data (Continued)

determined using those cell qualities, and/or to send messaging intended to induce the network to change the RRC state of the UE.

20 Claims, 17 Drawing Sheets

(56) References Cited

U.S. PATENT DOCUMENTS

2022/0232659 A1 7/2022 Kim et al.
2022/0295540 A1* 9/2022 Tsai .................. H04W 24/08

OTHER PUBLICATIONS

Interdigital, et al., "Support of SRB transmission using SDT", R2-2102086, 3GPP RAN WG2 Meeting #113-e, Agenda Item 8.6.3, Jan. 25th-Feb. 5, 2021, 3 pages.
Samsung, "Discussion on physical layer aspects of small data transmission", R1-2101165, 3GPP TSG RAN WG1 #104-e, e-Meeting, Agenda Item 5, Jan. 25-Feb. 5, 2021, 4 pages.
Sony, "Details of CG-based schemes for SDT in NR", R2-2009890, 3GPP TSG-RAN WG2 Meeting #112 electronic, Online, Agenda Item 8.6.5, Nov. 2-13, 2020, 3 pages.
U.S. Appl. No. 17/593,227, Notice of Allowance, Mar. 26, 2024, 8 pages.
U.S. Appl. No. 17/593,227, Non-Final Office Action, Dec. 7, 2023, 13 pages.
Intel Corporation, "SDT mechanism on RRC/non-RRC based approaches and RACH requirements", R2-2006713, 3GPP TSG RAN WG2 Meeting #111-e, Electronic Meeting, Agenda Item 8.6.2, Aug. 17-28, 2020, 10 pages.
ITRI , "Discussion on how to handle cell reselection during T319 for the case of SDT", R2-2009643, 3GPP TSG RAN WG2#112 electronic, Online, Agenda Item 8.6.3, 5 pages.
ITRI , "Discussion on how to handle cell reselection for the case of SDT", R2-2100826 (Resubmission of R2-2009643) 3GPP TSG RAN WG2#113 electronic, Online, Agenda Item 8.6.3, 2 pages.
PCT/CN2021/085054 , International Search Report and Written Opinion, Jun. 6, 2022 00:00:00.0, 9 pages.
Spreadtrum Communications , "Discussion on the general aspects for small data transmission", R2-2009151, 3GPP TSG-RAN WG2 Meeting #112 electronic, Online, Agenda Item 8.6.3, 2 pages.

* cited by examiner

METHODS OF MEASUREMENT IN SDT

TECHNICAL FIELD

This application relates generally to wireless communication systems, including wireless communication systems having user equipment (UE) capable of measuring one or more of a plurality of cells during an SDT procedure at the UE.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

In this disclosure, a CN in conjunction with the RAN may be referred to collectively as the "network" or the "wireless network." In such wireless networks, it may be that one or more RRC states of a UE is controlled by a RAN node of the wireless network (e.g., a gNB).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
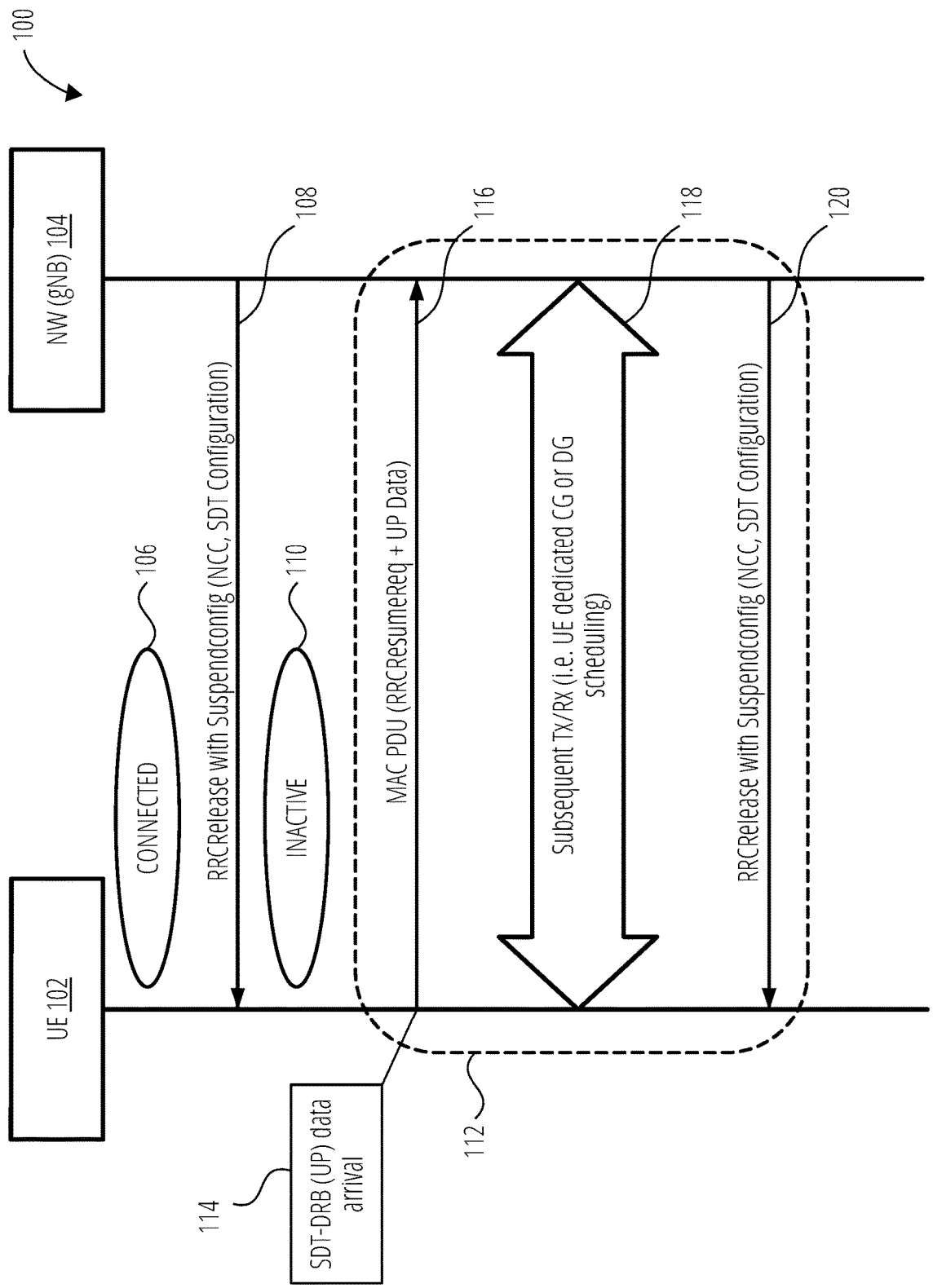
FIG. 1 illustrates a flow diagram for an SDT procedure between a UE and a network, according to an embodiment.

A RAN (such as an NG-RAN) and/or a connected UE may implement and/or use a state machine relative to radio resource control (RRC) aspects of the UE in order to manage an RRC state of the UE in an organized, coherent fashion. Accordingly, in NR, a UE may be in one of an RRC_CONNECTED (CONNECTED) state, an RRC_IDLE (IDLE) state, and an RRC_INACTIVE (INACTIVE) state.

The CONNECTED state, the UE has an active connection to the CN and an established RRC context with the RAN. General data transfer may occur in this state.

In the IDLE state, the UE has neither an active connection to the CN nor an established RRC context with the RAN. In this state, it may be that no data transfer occurs.

In an INACTIVE state, control plane (CP) aspects for the UE include a non-access stratum (NAS) connection to the CN. However, as to an RRC connection of the UE in the INACTIVE state, the UE has no dedicated access stratum (AS) resource (though the UE may, upon entering the INACTIVE state, save an RRC configuration from prior to entering the INACTIVE state).

In the INACTIVE state, user plane (UP) aspects may include that the UE does not regularly perform dedicated data transmission and/or reception. To perform such dedicated data transmissions and/or receptions, it may be that the UE first enters a CONNECTED state instead. For example, for a downlink (DL) transmission, a base station of the RAN pages the UE via a RAN-paging mechanism in order to trigger the UE to enter the CONNECTED mode. For an uplink (UL) transmission, the UE triggers a random access channel (RACH) procedure in order to enter the CONNECTED mode.

A state transition at the UE from a CONNECTED state to an INACTIVE state may be triggered by the reception at the UE from the network of an RRCRelease message. This RRCRelease message may also include Suspendconfig information, which may provide configurations for the UE while in the INACTIVE state, such as an RRC Inactive Radio Network Temporary Identity (I-RNTI) for the UE, RAN paging cycle information, and RAN notification area (RNA) information, among other items.

A state transition at the UE from an INACTIVE state to a CONNECTED state may be triggered by the reception at the UE from the network of an RRCResume message.

A state transition at the UE from an INACTIVE state to an IDLE state may be triggered by an RRCRelease message from the network. Alternatively, the UE may drop to an IDLE state from another state when it cannot locate a serving cell.

Finally, note that while in the INACTIVE or IDLE states, the UE may use cell selection and/or reselection to move between cells within an RNA without notifying the NG-RAN. To perform such cell selections and/or reselections (hereinafter discussed jointly as "reselection") at the UE while in the INACTIVE or IDLE state, the UE may measure the power of a neighbor cell and reselect to the new cell if, for example, the measured power level of the neighbor cell is better than the measured power level of the current serving cell by a threshold. When moving between RNAs attendant to such reselections, the UE may be configured to provide to the network NAS registration updates and/or RRC RNA updates, as applicable.

Wireless communications system implementing networks discussed herein may provide for radio resource management (RRM) measurement mechanisms. For example, when a UE is in a CONNECTED state, it may measure one or more beams of a cell (whether a current serving cell of the UE and/or a neighbor cell of the UE). Then, the measurement results (in the form of, e.g., power values) may be averaged as between each of the measured beams of the respective cell in order to derive an overall cell quality. In some cases, the UE is configured by the network to use a subset of beams of the cell in question in the manner described to determine a cell quality.

Attendant to these measurements, filtering may take place at two levels. A first filtering may occur at the physical layer in order to derive a beam quality for each of one or more beams of a cell. Then a second filtering may be used at an RRC level to derive a cell quality from using these one or more beam qualities. The derivation of a cell quality may be performed in the same way whether the cell is a current serving cell of the UE or a neighbor cell to the UE.

Measurement reports may then be sent from the UE to the network based on the network configuration for the serving cell and/or one or more neighbor cells (as applicable, according to network configuration). Such a measurement report may include one or more cell qualities and/or beam measurement qualities. A number of non-serving (e.g., neighbor) cells that the UE reports on could be limited or specified by a network configuration. Further, a network could use a whitelist and/or a blacklist to control for which cells may (or may not, as applicable) may have information corresponding thereto (whether cell or beam quality) appear in a measurement report (to be described) for the network (and/or that can trigger the sending of the measurement report). In some cases, a measurement report could contain the measurement results of, for example, a number of best detected beams (if the UE is configured by the network to make this report).

When in the CONNECTED state, the UE may perform such measurements on every slot. In other cases where a CONNECTED mode discontinuous reception (CDRX) is configured at the UE, the UE may instead perform such measurements per CDRX cycle.

When in the IDLE and/or INACTIVE state, the UE may perform measurements according to a network configuration as described above. However, in these RRC states, it may be that there is no mechanism for the UE to make a measurement report. Instead, these measurements may be used for cell reselection. For example, when in an IDLE or INACTIVE state, when the UE determines that a quality of a current serving cell is less than a configured threshold and a neighbor cell's quality meets a set of S-criteria (which may have previously been configured by the network), the UE may reselect away from its current serving cell in order to use the neighbor cell as its serving cell going forward. See 3GPP Technical Specification (TS) 38.304, "User Equipment (UE) procedures in Idle mode and RRC Inactive state (Release 16)" (version 16.3.0, December 2020), Section 5.2.3.2 for additional details regarding S-criteria.

While in the IDLE state or the INACTIVE state, the UE performs the described measurements per discontinuous reception (DRX) paging cycle.

It has been recognized that many modern applications for UEs may implement the transmission of small amounts of data in the UP to the network. Further, any need to transmit these small amounts of UP data may occur only infrequently, relatively speaking. For example, a UE may need to report a single sensor reading, a small amount of text, etc., and/or to report such data at only infrequent intervals. It has been recognized that in some of these cases, the transition of the UE to a CONNECTED mode in order to perform these small data transmissions (as described above) involves the use of relatively large amounts of network resources (in the form of signaling between the network and the UE, computation at each of the network and the UE, and time) as compared to the small amount of data that is to be transmitted.

In LTE, to reduce the amount of overhead related to the transmission of a small amounts of data, certain optimizations may have been made (e.g., the re-use of a NAS security context, and the relaxation of any expectation of acknowledgment above an RRC layer). However, these transmissions may still have required the UE to be in (moved to) an (LTE) RRC Connected state.

In NR, a small data transmission (SDT) procedure may be used at a UE that is in an INACTIVE mode that does not require a transition of the UE from the INACTIVE to a CONNECTED state in order to perform such transmissions of small amounts of data. Such an SDT procedure may provide a mechanism for the transmission of UP data in an uplink (UL) direction while the UE remains in an INACTIVE state. Further, it is contemplated that follow up transmissions (in either downlink (DL) or UL) may also be economically incorporated into the SDT procedure, as will be shown (again, while the UE remains in the INACTIVE state). Because a state change from INACTIVE to CONNECTED is not required, the SDT procedure may use relatively fewer network resources than existing methods to complete such transmission(s). Finally, the SDT procedure may be random access channel (RACH) procedure based, or it may use pre-configured physical uplink shared channel (PUSCH) resources.

Additional details regarding such NR SDT procedures can be found in 3GPP Work Item Description RP-193252, "New Work Item on NR small data transmissions in INACTIVE state," 3GPP TSG RAN Meeting #86, Sitges, Spain, Dec. 9-12, 2019.

FIG. 1 illustrates a flow diagram 100 for an SDT procedure 112 between a UE 102 and a network 104, according to an embodiment. As illustrated, the transmission(s) and reception(s) on the side of the network 104 may occur via a gNB of the network 104.

As illustrated, the flow diagram 100 begins with the UE 102 in a CONNECTED state 106. The network 104 then sends the RRCRelease with Suspendconfig message 108. The RRCRelease with Suspendconfig message 108 may include a Next Hop Chaining Counter (NCC) value and SDT configuration information. The SDT configuration information may include information such as whether the network is configured to use an SDT procedure 112, a data radio bearer (DRB) (SDT-DRB) associated with the SDT procedure 112, bandwidth parts (BWPs) or other transmission resources to use with/or the SDT procedure 112, and/or an upper bound on the size of UP data that can be used with the SDT procedure 112.

Upon receiving the RRCRelease with Suspendconfig message 108, the UP operation between the UE 102 and the network 104 may be modified such that a medium access control (MAC) context is reset, radio link control (RLC) for signaling radio bearer (SRB) 1 is re-established, and SRB2 and any data radio bearers (DRBs) are suspended. The UE 102 then enters the INACTIVE state 110.

The flow diagram 100 then illustrates the SDT procedure 112. This SDT procedure 112 begins with the arrival 114 of UP data at the UE 102 (e.g., from an application layer of the UE 102) to be sent according to the SDT procedure 112. This UP data may be for the associated SDT-DRB for the SDT procedure 112. The UE 102 may check to ensure that, for example, the UP data may be sent within any constraints provided in the SDT configuration that was received from the RRCRelease with Suspendconfig message 108 (such as determining that the network is configured to receive an SDT procedure generally, and/or that the size of the UP data is within any set upper bound for the SDT procedure 112).

The UE 102 may then send a MAC PDU 116 to the network 104 that contains an RRCResumeRequest message and the UP data to be sent according to the SDT procedure 112. The presence of the UP data within the MAC PDU 116 may be indicative to the network 104 that the UE 102 is attempting to initiate the SDT procedure 112, allowing the network 104 to respond according to the SDT procedure 112 as illustrated.

The SDT procedure 112 may further include the subsequent UE dedicated transmission(s)/reception(s) 118. For example, the network 104 may provide one or more additional configured (periodic) grants for the UE to use as part of the SDT procedure 112 (CG-SDTs) (in UL and/or DL) and/or one or more dynamic grants (DG-SDTs) (in UL or DL) for the UE to use as part of the SDT procedure 112. These subsequent UE dedicated transmission(s)/reception(s) 118 may be responsive to additional data transfer that are triggered by/inferred from, for example, the nature of the UP data that is sent from the UE 102 to the network 104 as part of the MAC PDU 116 at the beginning of the SDT procedure 112. The subsequent UE dedicated transmission(s)/reception(s) 118 may occur on one or more BWPs that is are configured as part of the SDT configuration within the RRCRelease with Suspendconfig message 108, and/or may be BWP(s) that were used when the UE was in the CONNECTED state 106 (the identities of which were stored upon the UE moving to the INACTIVE state 110. As illustrated, the subsequent UE dedicated transmission(s)/reception(s) 118 may be dedicated grants specifically for use by the UE 102.

The subsequent UE dedicated transmission(s)/reception(s) 118 are optional, in that in some cases the SDT procedure 112 needs only to transfer the UP data included in the MAC PDU 116 from the UE 102 to the network 104 (and no additional transmissions in either UL or DL are necessary as part of the SDT procedure 112).

The SDT procedure 112 ends when the network 104 sends the UE 102 an RRCRelease with Suspendconfig message 120. This RRCRelease with Suspendconfig message 120 may include and NCC and a SDT Configuration (similarly as to the RRCRelease with Suspendconfig message 108), which may be used during, e.g., any follow up SDT procedure that is to be performed after the SDT procedure 112 (not illustrated).

It is noted that the entire SDT procedure 112 is performed while the UE remains in the INACTIVE state 110.

It is further noted that the SDT procedure 112 as described in relation to FIG. 1 does not illustrate the use of any measurement or measurement reporting mechanisms from the UE 102 to the network 104. However, in some instances, it may be desirable to have a UE (such as the UE 102) provide to the UE measurement reports attendant to the use of/during an SDT procedure (such as the SDT procedure 112) between the UE and a network (such as the network 104). Such measurement reports could help the network to appropriately schedule any subsequent UE dedicated transmission(s)/reception(s) (such as the subsequent UE dedicated transmission(s)/reception(s) 118) that may be scheduled within the SDT procedure in the manner described above; or the network could, based on the UE measurement report, request that the UE enter a CONNECTED state for data transmission and mobility control if the quality of one or more cells at the UE is poor/worsening.

For example, the reception of such measurement reports may allow the network to schedule such grants for subsequent UE dedicated transmission(s)/reception(s) according to a strength of the current serving cell, such that a higher confidence that the UE will be able to use such grants can be maintained. For example, if the strength of the serving cell is relatively weaker, the network may schedule any grants for subsequent UE dedicated transmission(s)/reception(s) conservatively (e.g., by only providing one or a few DG-SDTs to the UE that are relatively near in time). This may help avoid the case where grants assigned more aggressively/further out in time go to waste (and/or network resources are spent to reclaim such grants) if reselection at the UE occurs. On the other hand, if the strength of the current serving cell of the UE is reported by the UE to be relatively stronger (such that reselection appears unlikely in the near term), the network may schedule such grants for subsequent UE dedicated transmission(s)/reception(s) more aggressively (e.g., by using CG-SDTs, which could be periodic in nature and therefore implicate a longer overall lifespan).

In some embodiments, if the strength of the current serving cell is reported as weak, the network may reconfigure the UE to enter the CONNECTED state for mobility control and data transmission scheduling.

In other embodiments the measurements taken by the UE during an SDT procedure may be used by the UE to determine to act itself to try to, for example, re-enter a CONNECTED mode with the network (e.g., in the case where the UE determines, based on these measurements, that is at risk of falling into a RLF condition). For example, when the quality of one or more cells at the UE is poor, and radio link failure (RLF) is detected, in order to combat this poor quality, the UE itself may trigger cell selection/reselection and perform an RRC connection reestablishment or RRC resume procedure in the new selected cell.

Accordingly, subsequent discussion herein discusses functionality attendant to the taking and/or reporting of RRM measurements as described herein at the UE of one or more cells (e.g., a current serving cell and/or one or more neighbor cells) by the UE during an SDT procedure. The taking of such measurements by the UE during an SDT procedure may be referred to herein as "SDT measurement" and the measurements themselves may be referred to as "SDT measurements." Further, a reporting of such SDT measurements by the UE to the network may be referred to herein an "SDT measurement report."

It may be that in some cases where an SDT procedure between the UE and the network is used, SDT measurements are taken during a certain period of the SDT procedure, which may be called the "SDT measurement period." In some cases, it may be that such an SDT measurement period begins to run after a certain part of an SDT procedure has been completed.

Figure 2:
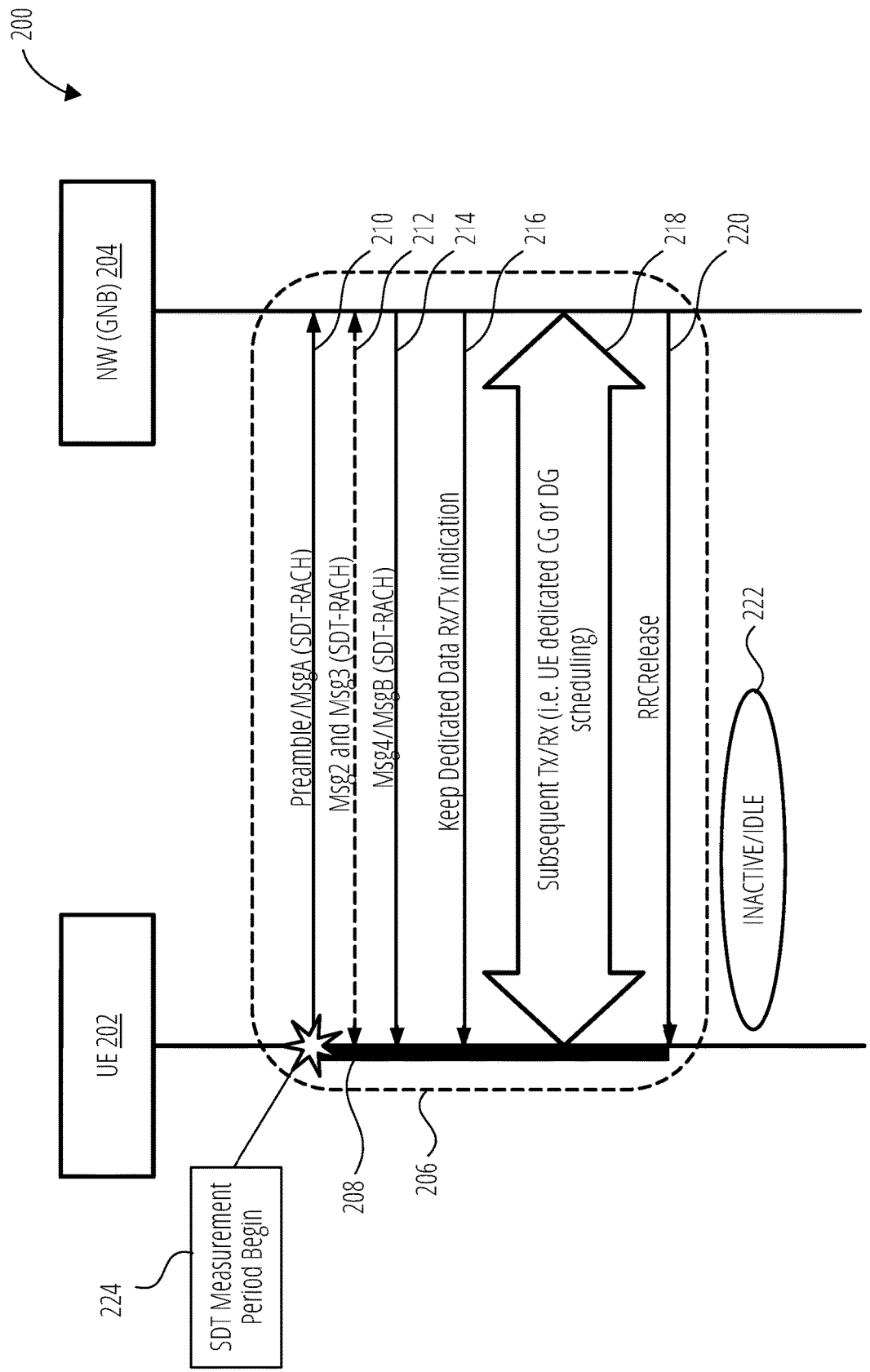
FIG. 2 illustrates a flow diagram having an SDT measurement period beginning of an SDT measurement period during which SDT measurements may be taken during an SDT procedure, according to an embodiment.

FIG. 2 illustrates a flow diagram 200 having an SDT measurement period beginning 224 of an SDT measurement period 208 during which SDT measurements may be taken during an SDT procedure 206, according to an embodiment. In the embodiment of FIG. 2, the UE 202 and the network 204 may perform the SDT procedure 206.

As part of the SDT procedure 206, the UE may send the preamble/MsgA 210 according to an initial access procedure of the SDT procedure 206. According to the illustration, the preamble/MsgA 210 represents two possible alternate cases of RACH for initial access in an SDT procedure, with the "preamble" portion corresponding to the use of a 4-step RACH and the "MsgA" portion corresponding to a 2-step RACH. In some embodiments, the Msg2 and Msg3 (for 4-step RACH) 212 may be used between the UE 202 and the network 204. Finally, the end of the RACH procedure is illustrated as Msg4/MsgB 214 with the "Msg4" portion corresponding to the use of a 4-step RACH and the "MsgB" portion corresponding to a 2-step RACH.

In terms of what was illustrated in FIG. 1, it may be that a MAC PDU (such as the MAC PDU 116 of FIG. 1) containing the RRCResumeRequest and the UP data may be sent in the Msg3 corresponding to the Msg2 and Msg3 (for 4-step RACH) 212, or in MsgA corresponding to the Msg4/MsgB 214 in the case that 2-step RACH is used.

While FIG. 2 and (subsequent figures) illustrate the use of a RACH procedure to begin the SDT procedure 206, it should be understood that an SDT procedure could be configured to use a pre-configured PUSCH resource for sending the UL data instead. In this case, the MAC PDU (such as the MAC PDU 116 Of FIG. 1) containing the RRCResumeRequest and the UP data may be sent on that configured PUSCH resource.

Further, while a first SDT procedure may use a RACH procedure, it is contemplated that any follow up SDT procedures may be scheduled according to a PUSCH configuration received during (or afterward, separately from) that first SDT procedure.

The network 204 may then send the keep dedicated data Rx/Tx indication 216, which may indicate to the UE the dedication of any resources (such as the subsequent UE dedicated transmission(s)/reception(s) 218) for the use by the UE 202.

The SDT procedure 206 then continues to its termination (which, in the case of FIG. 2, is caused by the RRCRelease message 220). While the SDT procedure 206 continues, the subsequent UE dedicated transmission(s)/reception(s) 218 may be performed (similar to the subsequent UE dedicated transmission(s)/reception(s) 118 of FIG. 1).

As illustrated at state 222, the UE 202 may one of 1) remain in the INACTIVE state or 2) fall to the IDLE state, corresponding to the nature of the RRCRelease message 220.

In the case of FIG. 2, an SDT measurement period beginning 224 has been illustrated corresponding to the preamble/MsgA 210. In other words, it may be that, in some cases, an SDT measurement period begins (e.g., the UE begins performing SDT measurement) upon the transmission of the preamble/MsgA 210 to the network 204, with the SDT measurement period beginning 224 occurring with the preamble in the case of a 4-step RACH and with the MsgA in the case of a 2-step RACH.

Figure 3:
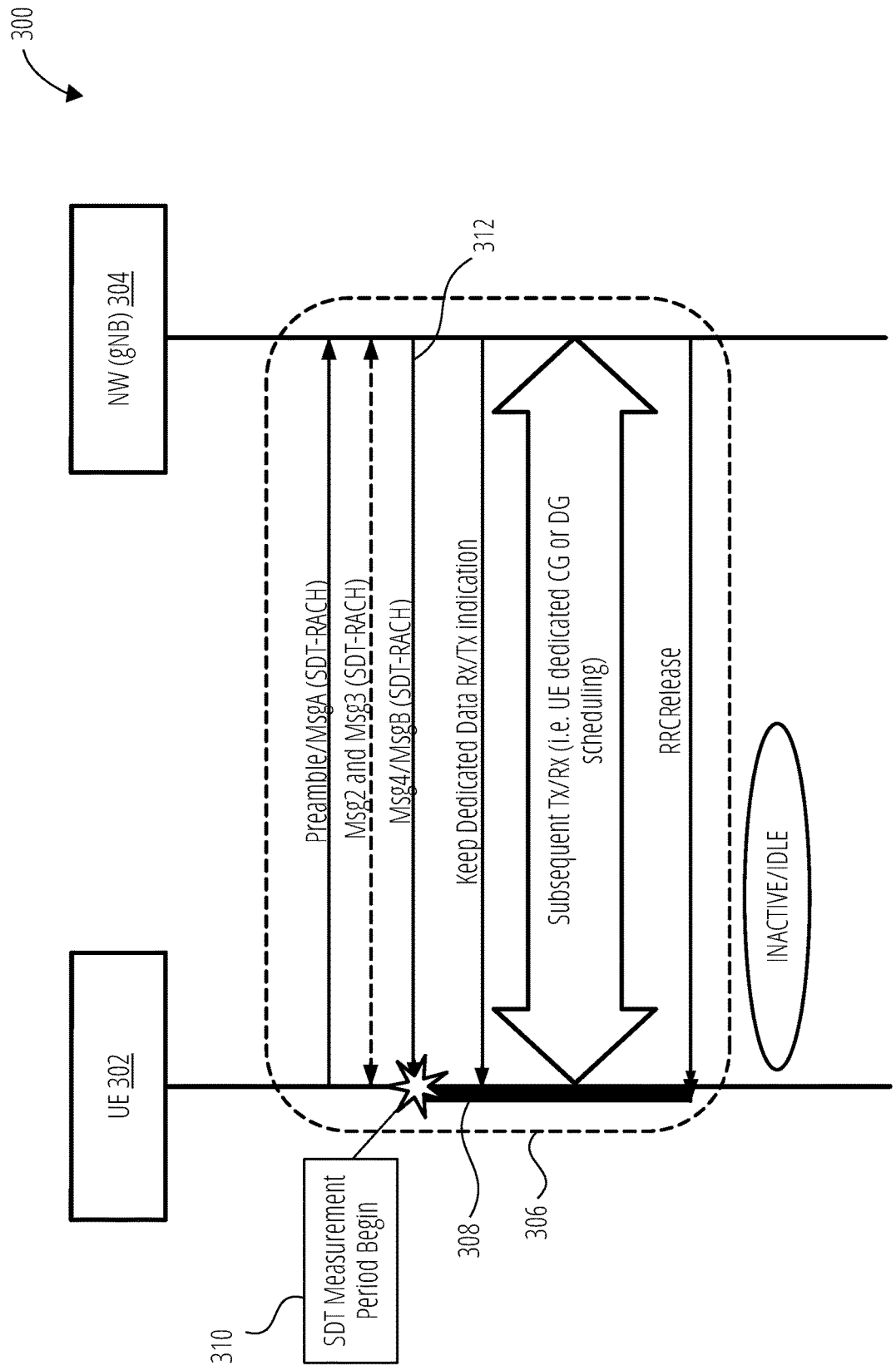
FIG. 3 illustrates a flow diagram having an SDT measurement period beginning of an SDT measurement period during which SDT measurements may be taken during an SDT procedure, according to an embodiment.

FIG. 3 illustrates a flow diagram 300 having an SDT measurement period beginning 310 of an SDT measurement period 308 during which SDT measurements may be taken during an SDT procedure 306, according to an embodiment. In the embodiment of FIG. 3, the UE 302 and the network 304 may perform the SDT procedure 306.

The flow diagram 300 of FIG. 3 differs from the flow diagram 200 of FIG. 2, in that the SDT measurement period beginning 310 has been illustrated corresponding to the Msg4/MsgB 312. In other words, it may be that, in some cases, the SDT measurement period 308 begins (e.g., the UE begins performing SDT measurement) upon the reception of the Msg4/MsgB 312 at the UE 302, or upon the successful completion of the RACH procedure, with the SDT measurement period beginning 310 occurring with the Msg4 in the case of a 4-step RACH and with the MsgB in the case of a 2-step RACH. In this way, the UE performs SDT measurement only for/during any subsequent UE dedicated transmissions/receptions (thereby using which may use, overall, fewer UE resources over the embodiment shown in FIG. 2)

Figure 4:
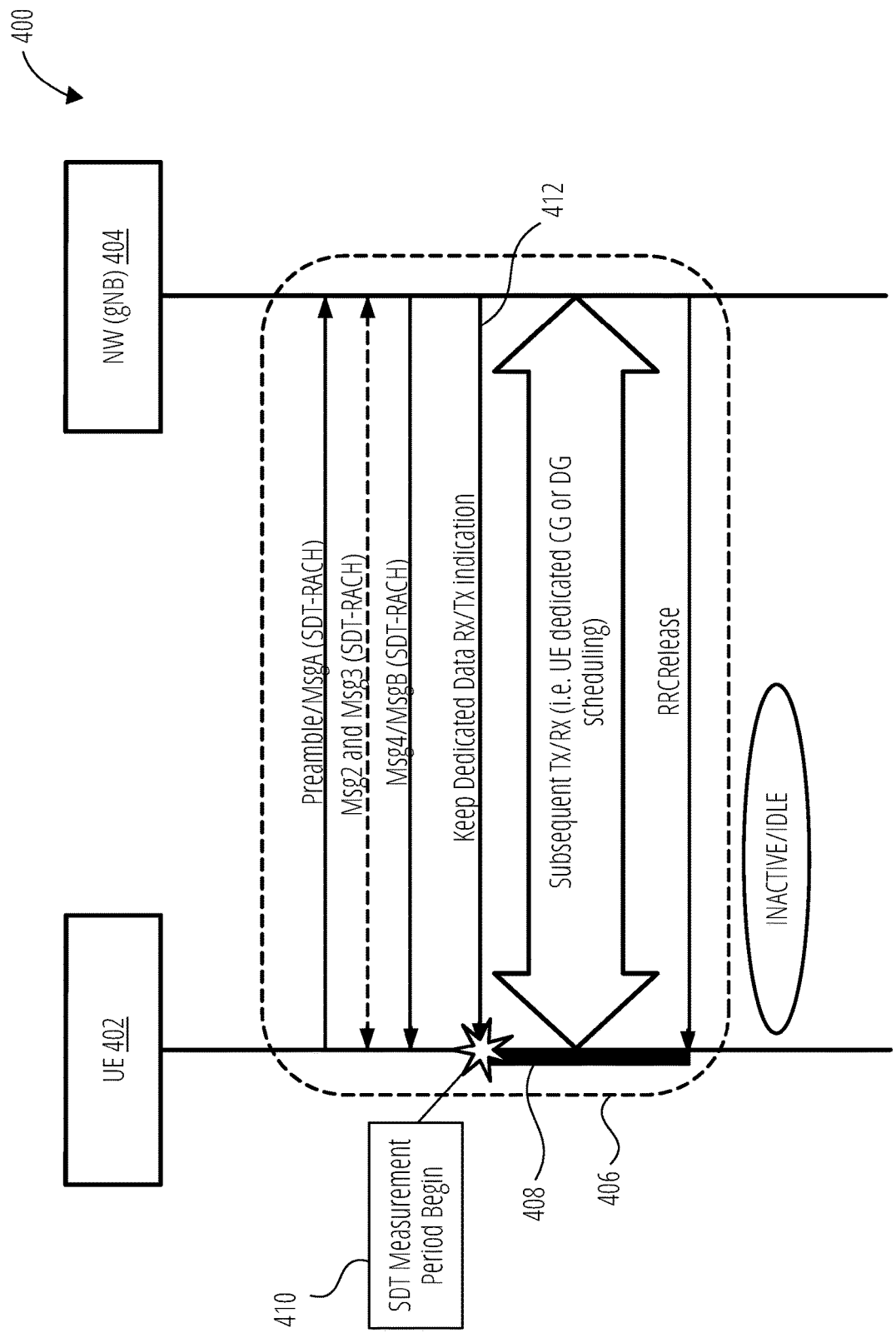
FIG. 4 illustrates a flow diagram having an SDT measurement period beginning of an SDT measurement period during which SDT measurements may be taken during an SDT procedure, according to an embodiment.

FIG. 4 illustrates a flow diagram 400 having an SDT measurement period beginning 410 of an SDT measurement period 408 during which SDT measurements may be taken during an SDT procedure 406, according to an embodiment. In the embodiment of FIG. 4, the UE 402 and the network 404 may perform the SDT procedure 406.

The flow diagram 400 of FIG. 4 differs from the flow diagram 200 of FIG. 2, in that the SDT measurement period beginning 410 has been illustrated as corresponding to the keep dedicated data Rx/Tx indication 412. In other words, it may be that, in some cases, the SDT measurement period 408 begins (e.g., the UE begins performing SDT measurement) upon the reception of the keep dedicated data Rx/Tx indication 412 indicating dedicated grants to use at the UE 302.

It may be that in some cases where an SDT procedure between the UE and the network is used an SDT measurement period of the SDT procedure ends (e.g., the UE stops performing SDT measurement) once a certain part of an SDT procedure has been completed. In some cases, the end of the SDT measurement period may correspond to the termination of the SDT procedure.

Figure 5:
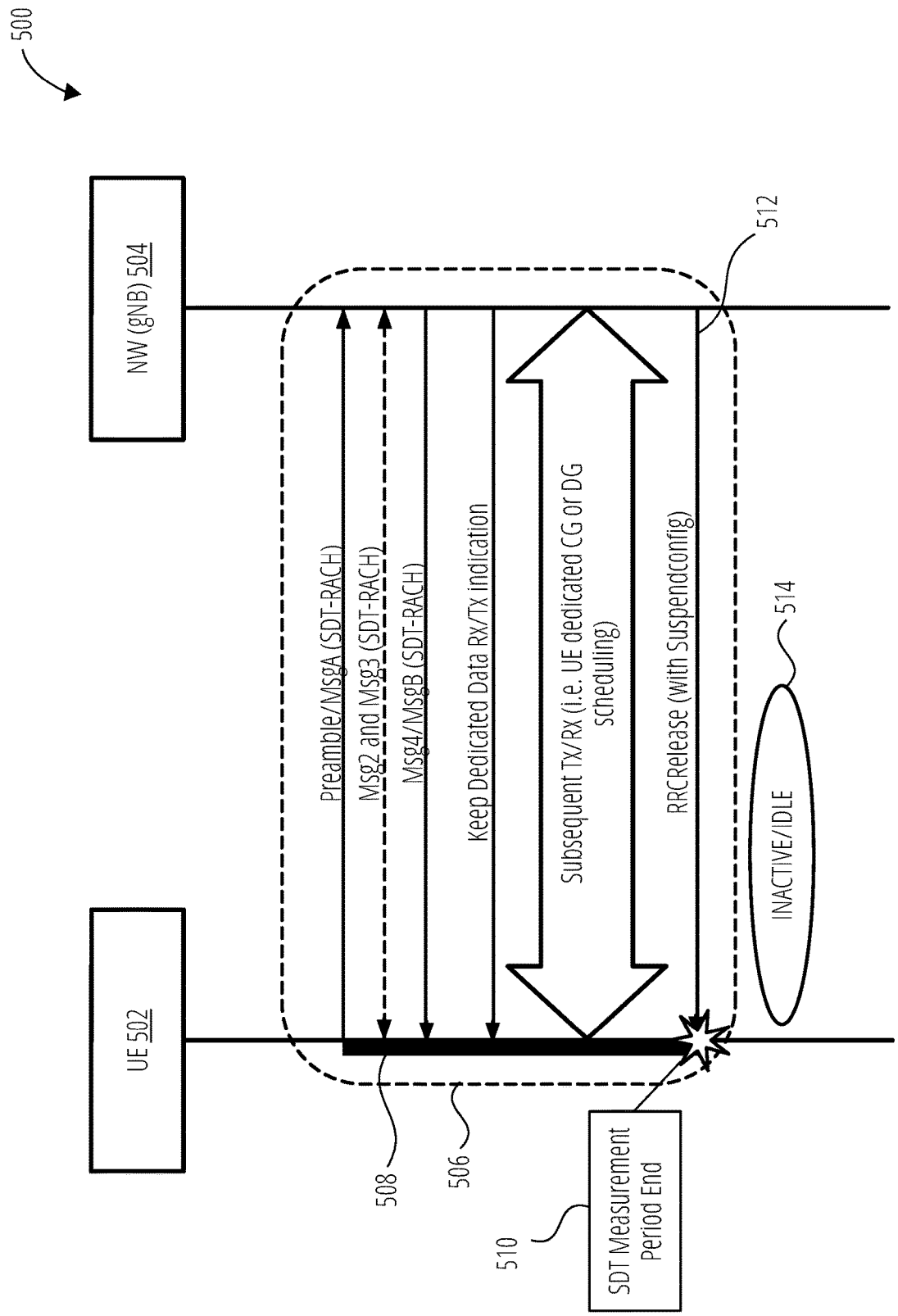
FIG. 5 illustrates a flow diagram having an SDT measurement period ending of an SDT measurement period during which SDT measurements may be taken during an SDT procedure, according to an embodiment.

FIG. 5 illustrates a flow diagram 500 having an SDT measurement period ending 510 of an SDT measurement period 508 during which SDT measurements may be taken during an SDT procedure 506, according to an embodiment. In the embodiment of FIG. 5, the UE 502 and the network 504 may perform the SDT procedure 506.

In FIG. 5, the SDT measurement period ending 510 of the SDT measurement period 508 has been illustrated. In the embodiment of FIG. 5, the SDT measurement period ending 510 corresponds to the reception of the RRCRelease message 512 and the use of the state 514 (e.g., the resumption of the INACTIVE state and/or a fall down to an IDLE state, corresponding to the nature of the RRCRelease message 512). In other words, it may be that, in some cases, the SDT measurement period 508 ends (e.g., the UE stops performing SDT measurement) upon the reception of an RRCRelease message 512.

Figure 6:
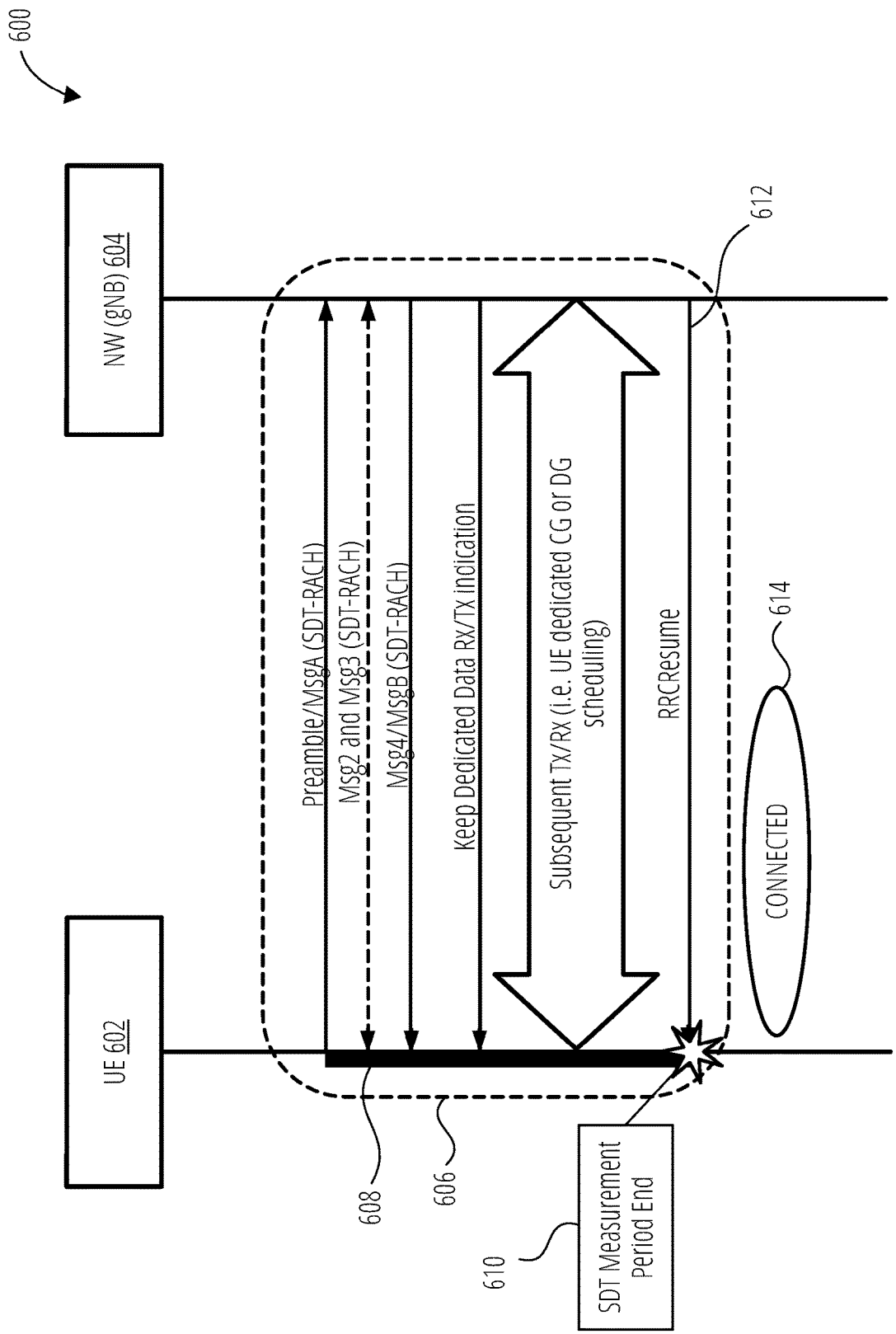
FIG. 6 illustrates a flow diagram having an SDT measurement period ending of an SDT measurement period during which SDT measurements may be taken during an SDT procedure, according to an embodiment.

FIG. 6 illustrates a flow diagram 600 having an SDT measurement period ending 610 of an SDT measurement period 608 during which SDT measurements may be taken during an SDT procedure 606, according to an embodiment. In the embodiment of FIG. 6, the UE 602 and the network 604 may perform the SDT procedure 606.

In FIG. 6, the SDT measurement period ending 610 of the SDT measurement period 608 has been illustrated. Further, an RRCResume message 612 is used to transition the UE 602 to a CONNECTED state 614 at the end of the SDT procedure 606.

In the embodiment of FIG. 6, the SDT measurement period ending 610 corresponds to the reception of the RRCResume message 612 and the transition to the CONNECTED state 614, corresponding to the RRCResume message 612. In other words, it may be that, in some cases, the SDT measurement period 608 ends (e.g., the UE stops performing SDT measurement) upon the reception of an RRCResume message 612.

Figure 7:
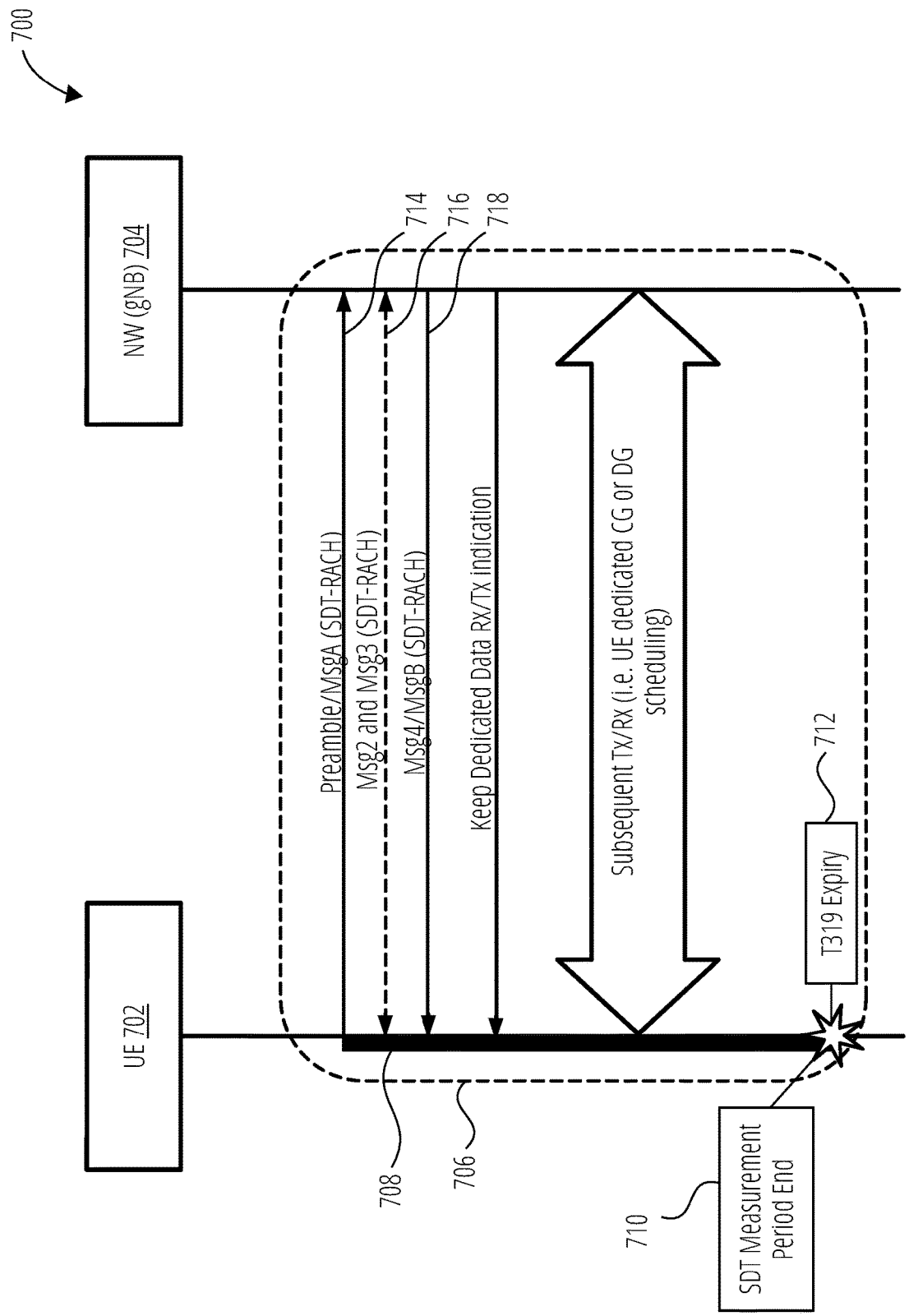
FIG. 7 illustrates a flow diagram having an SDT measurement period ending of an SDT measurement period during which SDT measurements may be taken during an SDT procedure, according to an embodiment.

FIG. 7 illustrates a flow diagram 700 having an SDT measurement period ending 710 of an SDT measurement period 708 during which SDT measurements may be taken during an SDT procedure 706, according to an embodiment. In the embodiment of FIG. 7, the UE 702 and the network 704 may perform the SDT procedure 706.

In FIG. 7, the SDT measurement period ending 710 of the SDT measurement period 708 has been illustrated. Further, rather than showing a message that ends the SDT procedure 706 (such as the RRCRelease message 512 as in FIG. 5 or the RRCResume message 612 as in FIG. 6), the SDT procedure 706 of FIG. 7 instead comes to an end because of a T319 time expiration 712.

The UE 702 may have set a T319 timer in conjunction with the initial access procedure represented by one or more of the preamble/MsgA 714, the Msg2 and Msg3 (for 4-step RACH) 716, and the Msg4/MsgB 718, with these constituted as, for example, the analogous messages that were described in relation to FIG. 2. In some cases, this timer waits for, for example, an RRCRelease message or an RRCResume message (as in, for example FIG. 5 and FIG. 6) to stop this timer. However, in the flow diagram 700 of FIG. 7, no such message arrives at the UE 702, and therefore the T319 time expiration 712 eventually occurs.

In the embodiment of FIG. 7, the SDT measurement period ending 710 corresponds to the T319 time expiration 712 at the UE. In other words, it may be that, in some cases, the SDT measurement period 708 ends (e.g., the UE stops performing SDT measurement) upon the T319 time expiration 712.

Figure 8:
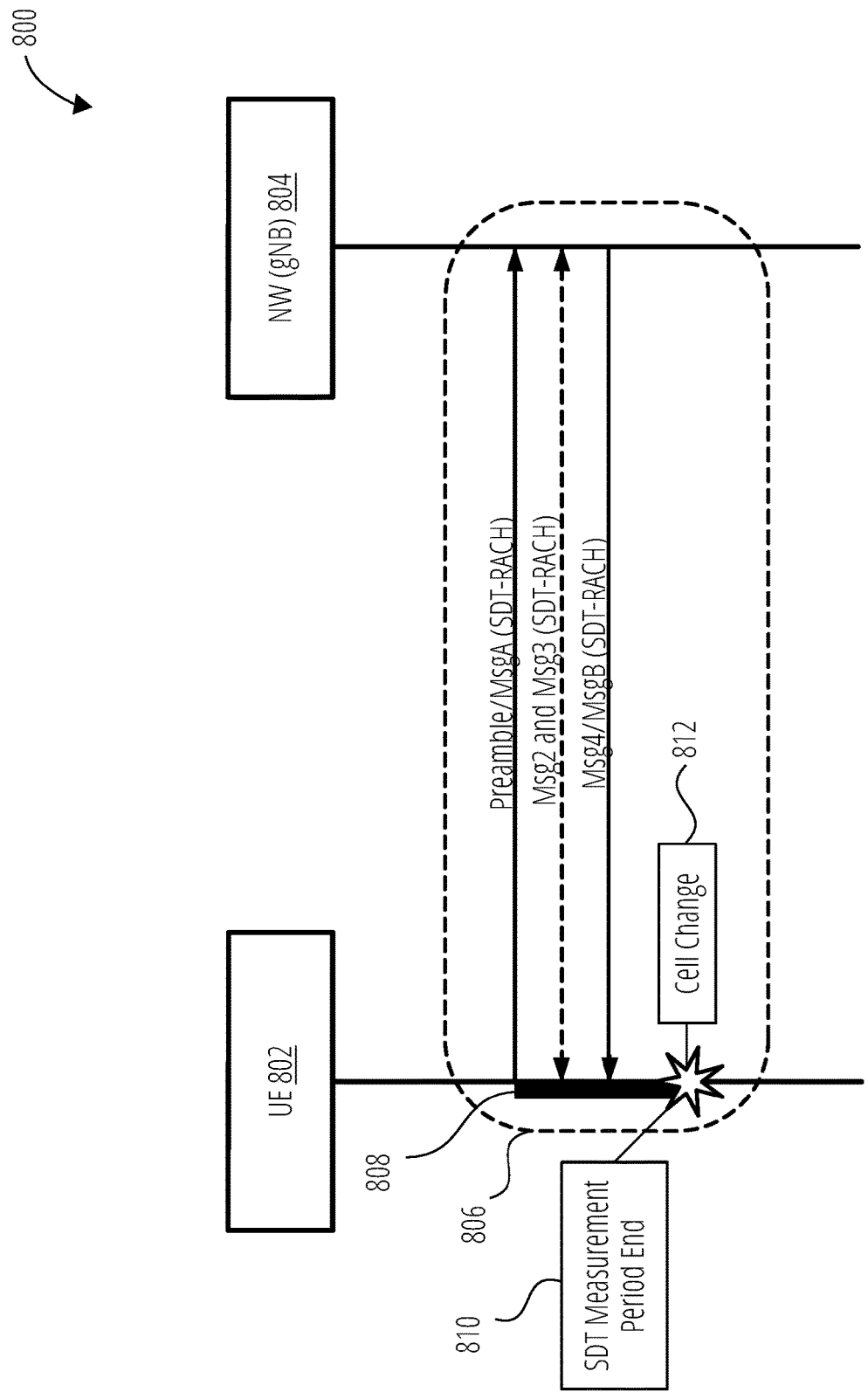
FIG. 8 illustrates a flow diagram having an SDT measurement period ending of an SDT measurement period during which SDT measurements may be taken during an SDT procedure, according to an embodiment.

FIG. 8 illustrates a flow diagram 800 having an SDT measurement period ending 810 of an SDT measurement period 808 during which SDT measurements may be taken during an SDT procedure 806, according to an embodiment. In the embodiment of FIG. 8, the UE 802 and the network 804 may perform the SDT procedure 806.

In FIG. 8, the SDT measurement period ending 810 of the SDT measurement period 808 has been illustrated. Further, rather than showing a message that ends the SDT procedure 806 (such as the RRCRelease message 512 as in FIG. 5 or the RRCResume message 612 as in FIG. 6), the SDT procedure 806 of FIG. 8 instead comes to an end because of a cell change 812. This cell change 812 may be due to a cell reselection made by the UE 802, in the manner (and for the reasons) previously described above.

In the embodiment of FIG. 8, the SDT measurement period ending 810 corresponds to the cell change 812 at the UE. In other words, it may be that, in some cases, the SDT measurement period 808 ends (e.g., the UE stops performing SDT measurement) upon the occurrence of the cell change 812 (e.g., a cell reselection).

Figure 9:
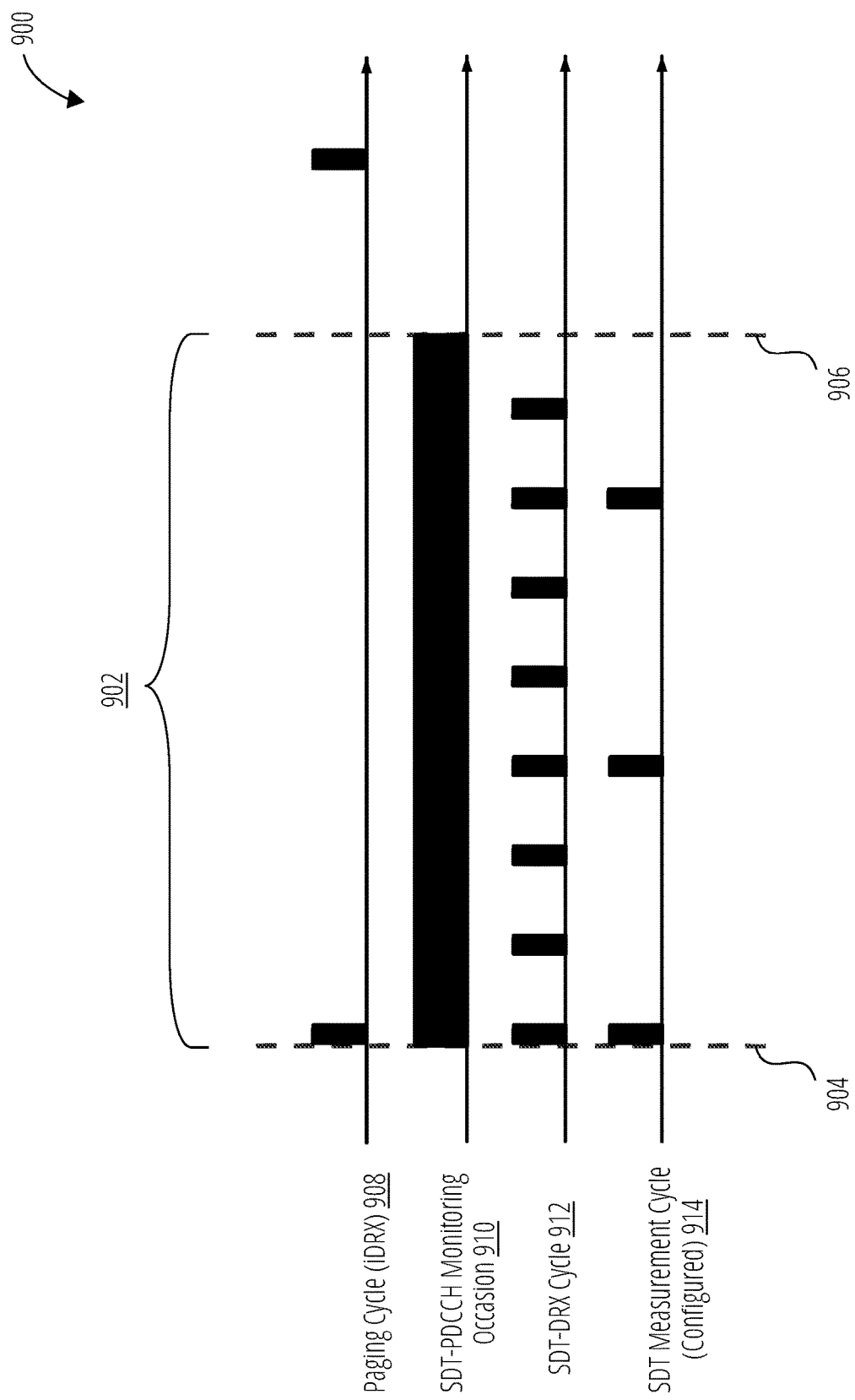
FIG. 9 is a diagram illustrating various arrangements of measurements during an SDT measurement period, according to various embodiments.

FIG. 9 is a diagram 900 illustrating various arrangements of measurements during an SDT measurement period 902, according to various embodiments. The SDT measurement period 902 may be an SDT measurement period corresponding to embodiments discussed herein, with an SDT measurement period beginning 904 and/or an SDT measurement period ending 906 as such are described herein. During the SDT measurement period 902, SDT measurement (e.g., measurement of a serving cell and/or one or more neighbor cells during the SDT measurement period) may occur according to any of a paging cycle 908, SDT-PDCCH monitoring occasion 910, an SDT discontinuous reception (SDT-DRX) cycle 912, or an SDT measurement cycle 914.

In the case of the paging cycle 908, it may be that a UE has been configured with DRX settings corresponding to a periodic monitoring by the UE of a downlink control channel (e.g., a physical downlink control channel (PDCCH)) for paging messages from the network. In between such monitoring occasions, the UE may enter a low power state. Accordingly, it may be that a UE may perform SDT measurement during such monitoring occasions of the paging cycle 908 that also occur during the SDT measurement period 902.

In the case of the SDT-PDCCH monitoring occasion 910, it may be that the UE has been configured with dedicated scheduling during the SDT procedure (e.g., has configured with grants for subsequent UE dedicated transmission(s)/reception(s) 118). The UE may, during the SDT procedure, perform monitoring of an SDT-PDCCH during the SDT procedure, in relation to these grants. While performing this monitoring, the UE may also perform SDT measurement. Note that while the SDT-PDCCH monitoring occasion 910 uses is illustrated using solid bar within the SDT measurement period 902 to illustrate this SDT-PDCCH monitoring (and thus the SDT measurement) during the SDT measurement period 902, it could be that the UE performs SDT-PDCCH monitoring (and thus SDT measurement) during less than the entire SDT measurement period 902 and as configured by the network.

In the case of the SDT-DRX cycle 912, it may be that a UE has been configured with the SDT-DRX cycle 912 by the network. This SDT-DRX cycle 912 may be different than a paging cycle that may be (separately) used between the UE and the network (for example, compare the SDT-DRX cycle 912 with the paging cycle 908). The network may configure the UE to use the SDT-DRX cycle 912 to arrange for UE monitoring of an SDT-PDCCH during the SDT procedure (e.g., during monitoring occasions of the SDT-DRX cycle 912 that occur during the SDT procedure). Further, the UE may perform SDT measurement during monitoring occasions according to this SDT-DRX cycle 912 that occur during the SDT measurement period 902. In this manner, the UE can be configured by the network to perform SDT measurement periodically within the SDT measurement period 902.

In the case of the SDT measurement cycle 914, it may be that a UE has been configured by the network to perform SDT measurement according to one or more measurement occasions. This configuration may be specific to the performance of SDT measurement (and not related to, e.g., the monitoring of a PDCCH or an SDT-PDCCH, as in, respectively, the embodiments relative to the paging cycle 908, the SDT-PDCCH monitoring occasion 910, and/or the SDT-DRX cycle 912). It is anticipated that the network could configure these measurement occasions to be periodic (as illustrated), but this is not necessarily required. The SDT measurement cycle may be configured at the UE by the wireless network via one of an RRCRelease message and a system information block (SIB) of a serving cell of the UE.

Once the UE has taken the measurements during an SDT measurement period (and according to any applicable arrangements for measuring during that period, as shown in relation to FIG. 9, the UE may proceed to use such measurements to calculate a quality of one or more cells and/or one or more beams for which such measurements were taken, in the manner previously described.

Figure 10:
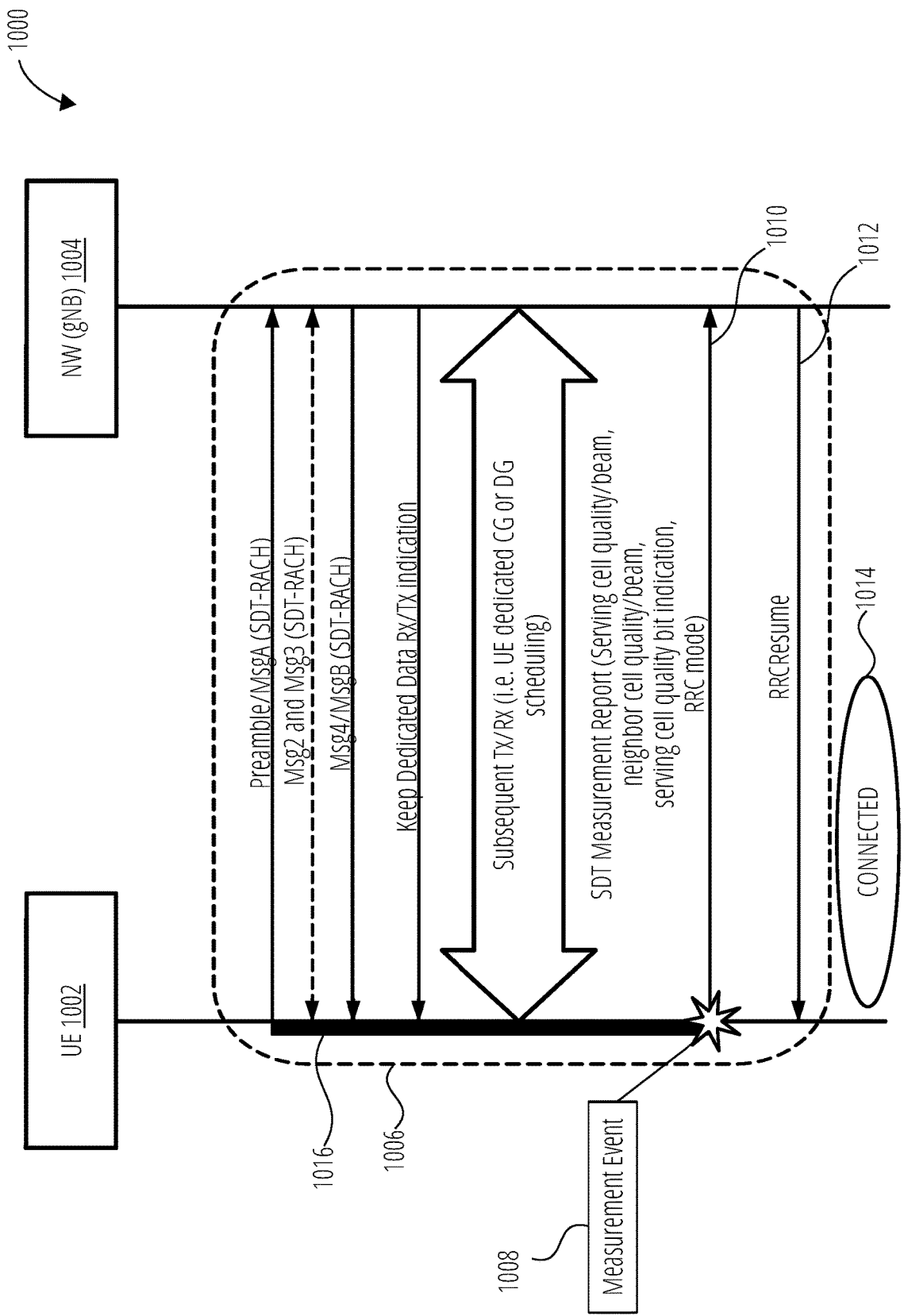
FIG. 10 illustrates a flow diagram for sending an SDT measurement report during an SDT procedure, according to an embodiment.

In some instances, a UE may use such determined qualities to prepare and send an SDT measurement report to the network. FIG. 10 illustrates a flow diagram 1000 for sending an SDT measurement report 1010 during an SDT procedure 1006, according to an embodiment. The SDT procedure 1006 may be according to any SDT procedure described herein.

As illustrated, the UE 1002 proceeds to perform SDT measurement during an SDT measurement period 1016. The UE 1002 may be configured to detect, during the SDT measurement period 1016, one or more measurement events (or occurrenc(es) of one or more measurement events) that triggers the sending of a measurement report to the network.

In a first example, the network 1004 may have (previously) configured the UE 1002 with a quality threshold for its current serving cell. In this example, a measurement event occurs when the quality of the serving cell as determined by the UE 1002 is less than (or, in some embodiments, less than or equal to) this threshold. The UE 1002 may send the SDT measurement report 1010 to the network 1004 in response to the occurrence of this measurement event.

As another example, the network 1004 may have (previously) configured the UE 1002 with a quality threshold for its current serving cell and a quality threshold for a neighbor cell. In this example, a measurement event occurs when the quality of the serving cell as determined by the UE 1002 is less than (or, in some embodiments, less than or equal to) the serving cell threshold, and when the quality of a neighbor cell as determined by the UE 1002 is greater than (or, in some embodiments, greater than or equal to) the neighbor cell threshold. The UE 1002 may send the SDT measurement report 1010 to the network 1004 in response to the occurrence of this measurement event.

In another example, a measurement even occurs when the UE determines (for example, based on a radio link monitoring (RLM) procedure operating at the UE in concurrently/during with the SDT measurement period 1016), that it is likely to experience RLF on its current serving cell in the near term. The UE 1002 may send the SDT measurement report 1010 to the network 1004 in response to the occurrence of this measurement event.

The flow diagram 1000 accordingly illustrates that, during the SDT measurement period 1016, a measurement event 1008 such as previously described occurs. As illustrated, the UE 1002 accordingly prepares and sends the SDT measurement report 1010 to the network 1004.

The SDT measurement report 1010 may include data that is determined using the qualities of the one or more cells which were calculated using the SDT measurements, as described above. For example, the SDT measurement report 1010 may include a quality of the serving cell of the UE 1002. In some cases, an index of a best measured beam of the serving cell, and/or that beam's quality, may also be indicated.

The SDT measurement report 1010 may include a quality of a neighbor cell of the UE 1002. In some cases, an indication of an identity of the neighbor cell, an index of a best measured beam of the neighbor cell, and/or that beam's quality may also be indicated. Further, it is anticipated that this information could be indicated for multiple neighbor cells of the UE 1002.

The SDT measurement report 1010 may include an indication bit corresponding to the quality of the serving cell of the UE. For example, by being presented one state, the bit may inform the network 1004 that the serving cell of the UE 1002 is weak and/or weakening, with the other state informing the network 1004 of the opposite (e.g., that the serving cell of the UE 1002 is not weak or is not weakening).

The SDT measurement report 1010 may include an expected (or desired) RRC state of the UE. For example, the UE 1002 may use the SDT measurements to determine that its current serving cell is weak and therefore it is likely to experience RLF if it is not moved to a CONNECTED state with the network 1004. Accordingly, the UE 1002 may include an indication that it expects (or desires) to be changed to the CONNECTED state.

It is contemplated that any possible subset of the data described and illustrated in relation to the SDT measurement report 1010 could be provided a measurement report.

The network 1004 may receive the SDT measurement report 1010 from the UE 1002 and respond in various ways. For example, the information in the SDT measurement report 1010 may be used to schedule such grants for subsequent UE dedicated transmission(s)/reception(s) according to a quality of the UE serving cell, in the manner described above. Further, it is also contemplated that the network 1004 may use the data found in the SDT measurement report 1010 to determine to perform messaging with the UE 1002 such that the UE 1002 is moved a different RRC state. For example, in the flow diagram 1000, responsive to the data in the SDT measurement report 1010, the network 1004 determines to send the UE 1002 the RRCResume message 1012 such that the UE 1002 is moved the CONNECTED state 1014.

FIG. 10 illustrates that the SDT measurement period 1016 is terminated by the detection of the measurement event

1008. This may be the case in some embodiments (e.g., where the UE expects, based on the sending of the SDT measurement report 1010, to soon be moved a CONNECTED mode). However, in other embodiments, the SDT measurement period 1016 may continue until another reason for terminating the SDT measurement period 1016 occurs, as described above.

Figure 11:
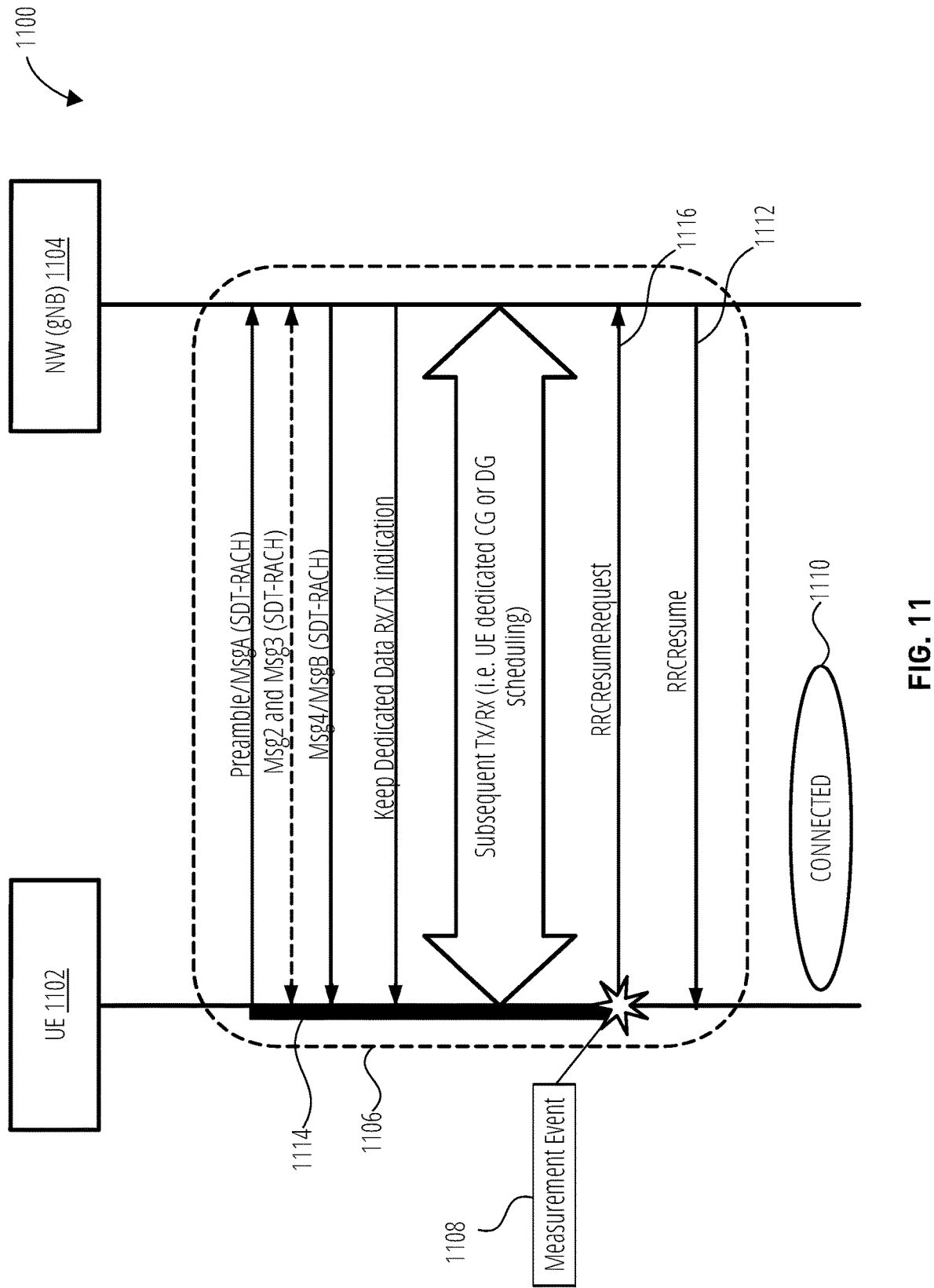
FIG. 11 illustrates a flow diagram for sending an RRCResumeRequest message during an SDT procedure, according to an embodiment.

In some instances, a UE may use cell qualities determined using SDT measurements to act itself to try to, for example, re-enter a CONNECTED mode with the network. FIG. 11 illustrates a flow diagram 1100 for sending an RRCResumeRequest message 1116 during an SDT procedure 1106, according to an embodiment. The SDT procedure 1106 may be according to any SDT procedure described herein.

As illustrated, the UE 1102 proceeds to perform SDT measurement during an SDT measurement period 1114. The UE 1102 may be configured to detect, during the SDT measurement period 1114, one or more measurement events that triggers a reaction by the UE 1102. For example, the network 1104 may have (previously) configured the UE 1102 with a threshold for its current serving cell, may have (previously) configured the UE 1102 with a threshold for its current serving cell and a threshold for a neighbor cell, to be evaluated in conjunction, and/or the UE 1102 may use the SDT measurements to determine that an RLF on the serving cell is likely, in the manner described above. The flow diagram 1100 accordingly illustrates, during the SDT measurement period 1114, the occurrence of such a measurement event 1108.

As illustrated, the UE 1102 prepares and sends the RRCResumeRequest message 1116 to the network 1104 in response to the measurement event 1108, in attempt to re-enter the CONNECTED state with the network. In the embodiment of FIG. 11, the network 1104 responds with an RRCResume message 1112, after which the UE enters the CONNECTED state 1110.

As a result of being placed in the CONNECTED state 1110, the UE may take advantage of additional signaling with the network 1104 that is available when in the CONNECTED state 1110 (such as, e.g., more robust signaling intended to deal with a potentially weak serving cell, network handover from the serving cell to a neighbor cell, etc.).

It is contemplated that in some embodiments, rather than using the RRCResumeRequest message 1116, the UE 1102 could instead send an RRCReestablishmentRequest message to trigger the network 1104 to move the UE 1102 to the CONNECTED state 1110. In this case, the network 1104 may not respond with the RRCResume message 1112 but rather with an RRCReestablishment message in the same location, and then proceed through an RRC (re)establishment procedure with the UE 1102 such that the UE 1102 ends up in the CONNECTED state 1110.

In the case of an occurrence of a measurement event such as the measurement event 1108 that results in the sending of an RRCResumeRequest message or an RRCReestablishmentRequest message by the UE, the SDT measurement period 1114 ends upon the sending of such a request.

Figure 12:
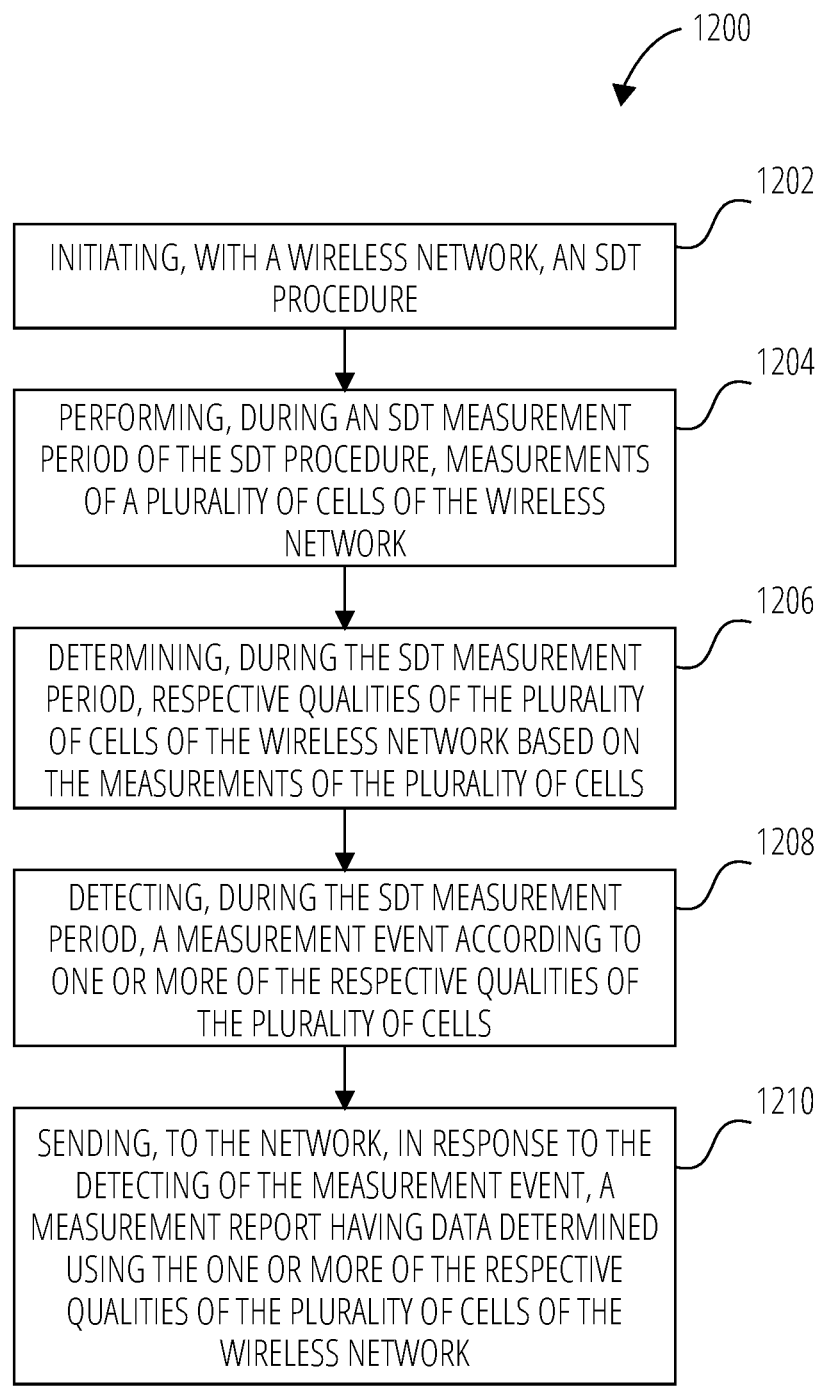
FIG. 12 illustrates a method of a UE, according to an embodiment.

FIG. 12 illustrates a method 1200 of a UE, according to an embodiment. The method 1200 includes initiating 1202, with a wireless network, an SDT procedure. The SDT procedure may be performed while the UE is in an INACTIVE state.

The method 1200 further includes performing 1204, during an SDT measurement period of the SDT procedure, measurements of a plurality of cells of the wireless network.

The method 1200 further includes determining 1206, during the SDT measurement period, respective qualities of the plurality of cells of the wireless network based on the measurements of the plurality of cells.

The method 1200 further includes detecting 1208, during the SDT measurement period, a measurement event according to one or more of the respective qualities of the plurality of cells.

The method 1200 further includes sending 1210, to the network, in response to the detecting of the measurement event, a measurement report having data determined using the one or more of the respective qualities of the plurality of cells of the wireless network.

In some embodiments of the method 1200, the plurality of cells comprises a serving cell of the UE and a neighbor cell of the plurality of cells.

In some embodiments of the method 1200, the measurement event is based on a quality of a serving cell of the plurality of cells. In some such embodiments, the measurement event is further based on a quality of a neighbor cell of the plurality of cells.

In some embodiments of the method 1200, the measurement event is based on RLM of a serving cell of the plurality of cells.

In some embodiments of the method 1200, the data comprises a quality of a serving cell of the plurality of cells. In some such embodiments, the data further comprises a beam index of a beam of the serving cell of the plurality of cells. In further such embodiments, the data further comprises a quality of a neighbor cell of the plurality of cells and a beam index of a beam of the neighbor cell of the plurality of cells.

In some embodiments of the method 1200, the data comprises an indication bit corresponding to the quality of a serving cell of the plurality of cells.

In some embodiments of the method 1200, the data comprises an expected RRC state of the UE.

In some embodiments of the method 1200, the SDT measurement period begins when a first message of an SDT-RACH procedure is sent by the UE.

In some embodiments of the method 1200, the SDT measurement period begins when an SDT-RACH procedure is successfully completed at the UE.

In some embodiments of the method 1200, the SDT measurement period begins when the UE receives an indication from the wireless network of dedicated grants to use after an SDT-RACH procedure.

In some embodiments of the method 1200, the SDT measurement period ends when the UE receives one of an RRCRelease message and an RRCResume message.

In some embodiments of the method 1200, the SDT measurement period ends when a T319 timer at the UE expires.

In some embodiments of the method 1200, the SDT measurement period ends when the UE performs a reselection away from a serving cell of the UE.

In some embodiments of the method 1200, the SDT measurement period ends when the measurement event occurs.

In some embodiments of the method 1200, the measurements are performed during the SDT measurement period according to a paging cycle of the UE.

In some embodiments of the method 1200, the measurements are performed during the SDT measurement period according to a configuration, by the wireless network, for monitoring of an SDT-PDCCH.

In some embodiments of the method 1200, the measurements are performed during the SDT measurement period according to an SDT-DRX cycle. In some of these embodiments, the SDT-DRX cycle is configured at the UE by the wireless network.

In some embodiments of the method 1200, the measurements are performed during the SDT period according to an SDT measurement cycle configured at the UE by the wireless network. In some of these embodiments, the SDT measurement cycle is configured at the UE by the wireless network via one of an RRCRelease message and an SIB of a serving cell of the plurality of cells.

Embodiments contemplated herein include an apparatus comprising means to perform one or more elements of the method 1200. This apparatus may be, for example, an apparatus of a UE 1500 as described below.

Embodiments contemplated herein include one or more non-transitory computer-readable media comprising instructions to cause an electronic device, upon execution of the instructions by one or more processors of the electronic device, to perform one or more elements of the method 1200. This non-transitory computer-readable media may be, for example, the memory 1506 of the UE 1500 described below, and/or the peripheral devices 1704, the memory/storage devices 1714, and/or the databases 1720 of the components 1700 as described below.

Embodiments contemplated herein include an apparatus comprising logic, modules, or circuitry to perform one or more elements of the method 1200. This apparatus may be, for example, an apparatus of a UE 1500 as described below.

Embodiments contemplated herein include an apparatus comprising: one or more processors and one or more computer-readable media comprising instructions that, when executed by the one or more processors, cause the one or more processors to perform one or more elements of the method 1200. This apparatus may be, for example, an apparatus of a UE 1500 as described below.

Embodiments contemplated herein include a signal as described in or related to one or more elements of the method 1200.

Embodiments contemplated herein include a computer program comprising instructions, wherein execution of the program by a processing element is to cause the processing element to carry out one or more elements of the method 1200. These instructions may be, for example, the instructions 1712 of the components 1700 as described below.

Figure 13:
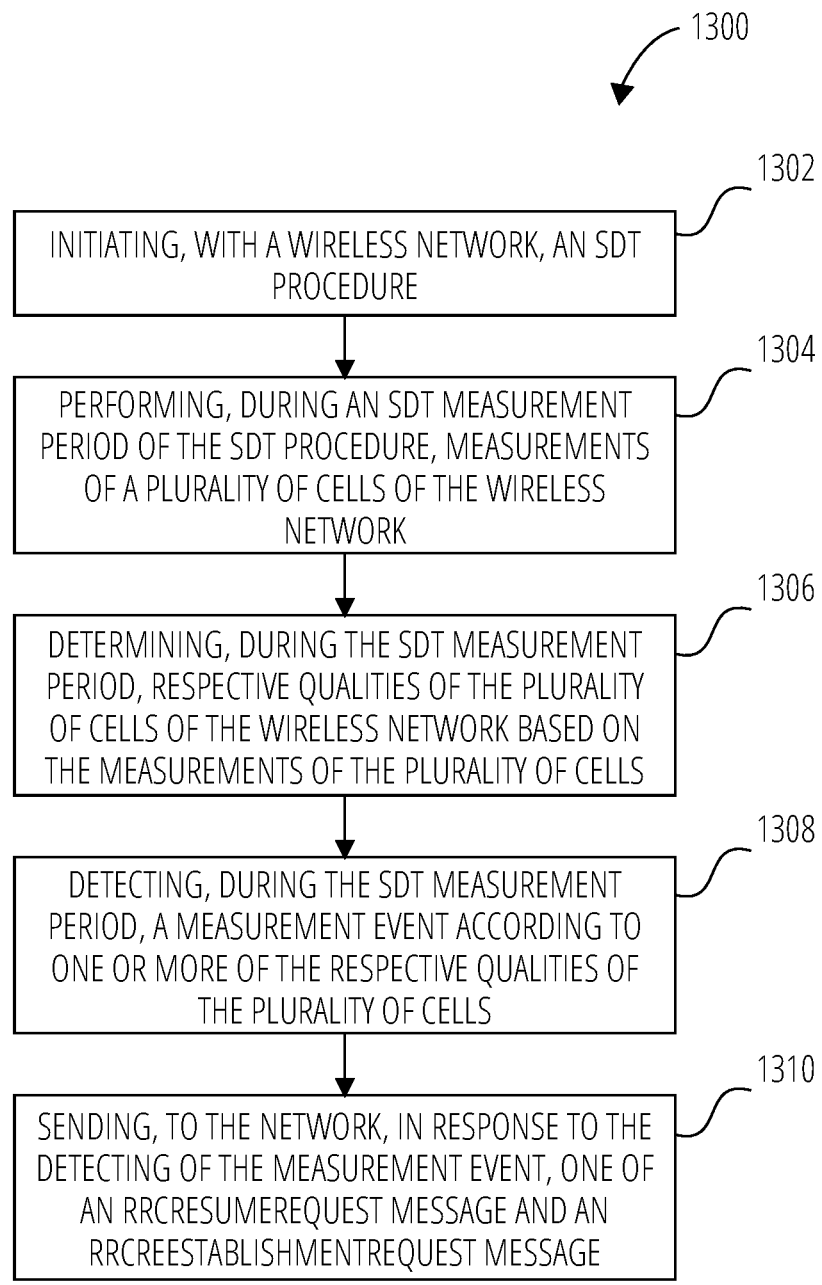
FIG. 13 illustrates a method of a UE, according to an embodiment.

FIG. 13 illustrates a method 1300 of a UE, according to an embodiment. The method 1300 includes initiating 1302, with a wireless network, an SDT procedure. The SDT procedure may be performed while the UE is in an INACTIVE state.

The method 1300 further includes performing 1304, during an SDT measurement period of the SDT procedure, measurements of a plurality of cells of the wireless network.

The method 1300 further includes determining 1306, during the SDT measurement period, respective qualities of the plurality of cells of the wireless network based on the measurements of the plurality of cells.

The method 1300 further includes detecting 1308, during the SDT measurement period, a measurement event according to one or more of the respective qualities of the plurality of cells.

The method 1300 further includes sending 1310, to the network, in response to the detecting of the measurement event, one of an RRCResumeRequest message and an RRCReestablishmentRequest message.

In some embodiments of the method 1300, the plurality of cells comprises a serving cell of the UE and a neighbor cell of the plurality of cells.

In some embodiments of the method 1300, the measurement event is based on a quality of a serving cell of the plurality of cells. In some of these embodiments, the measurement event is further based on a quality of a neighbor cell of the plurality of cells.

In some embodiments of the method 1300, the measurement event is based on RLM of a serving cell of the plurality of cells.

In some embodiments of the method 1300, the SDT measurement period begins when a first message of an SDT-RACH procedure is sent by the UE.

In some embodiments of the method 1300, the SDT measurement period begins when an SDT-RACH procedure is successfully completed at the UE.

In some embodiments of the method 1300, the SDT measurement period begins when the UE receives an indication from the wireless network of dedicated grants to use after an SDT-RACH procedure.

In some embodiments of the method 1300, the SDT measurement period ends when the one of the RRCResumeRequest message and the RRCReestablishmentRequest message is sent.

In some embodiments of the method 1300, the measurements are performed during the SDT measurement period according to a paging cycle of the UE.

In some embodiments of the method 1300, the measurements are performed during the SDT measurement period according to a configuration, by the wireless network, for monitoring an SDT-PDCCH.

In some embodiments of the method 1300, the measurements are performed during the SDT measurement period according to an SDT-DRX cycle. In some of these embodiments, the SDT-DRX cycle is configured at the UE by the wireless network.

In some embodiments of the method 1300, the measurements are performed during the SDT period according to a SDT measurement cycle configured at the UE by the wireless network. In some of these embodiments, the SDT measurement cycle is configured at the UE by the wireless network via one of an RRCRelease message and an SIB of a serving cell of the plurality of cells.

Embodiments contemplated herein include an apparatus comprising means to perform one or more elements of the method 1300. This apparatus may be, for example, an apparatus of a UE 1500 as described below.

Embodiments contemplated herein include one or more non-transitory computer-readable media comprising instructions to cause an electronic device, upon execution of the instructions by one or more processors of the electronic device, to perform one or more elements of the method 1300. This non-transitory computer-readable media may be, for example, the memory 1506 of the UE 1500 described below, and/or the peripheral devices 1704, the memory/storage devices 1714, and/or the databases 1720 of the components 1700 as described below.

Embodiments contemplated herein include an apparatus comprising logic, modules, or circuitry to perform one or more elements of the method 1300. This apparatus may be, for example, an apparatus of a UE 1500 as described below.

Embodiments contemplated herein include an apparatus comprising: one or more processors and one or more computer-readable media comprising instructions that, when executed by the one or more processors, cause the one or more processors to perform one or more elements of the method 1300. This apparatus may be, for example, an apparatus of a UE 1500 as described below.

Embodiments contemplated herein include a signal as described in or related to one or more elements of the method 1300.

Embodiments contemplated herein include a computer program comprising instructions, wherein execution of the program by a processing element is to cause the processing element to carry out one or more elements of the method 1300. These instructions may be, for example, the instructions 1712 of the components 1700 as described below.

Figure 14:
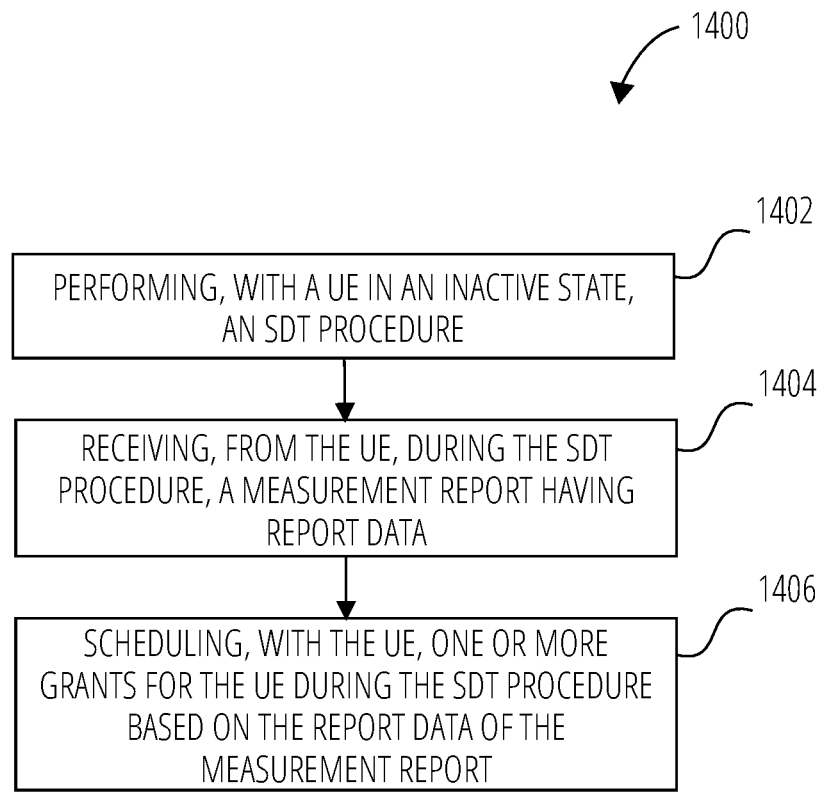
FIG. 14 illustrates a method of a network, according to an embodiment.

FIG. 14 illustrates a method 1400 of a network, according to an embodiment. The method 1400 includes performing 1402, with a UE in an inactive state, an SDT procedure.

The method 1400 further includes receiving 1404, from the UE, during the SDT procedure, a measurement report having report data.

The method 1400 further includes scheduling 1406, with the UE, one or more grants for the UE during the SDT procedure based on the report data of the measurement report.

In some embodiments of the method 1400, the report data comprises a quality of one or more cells of the wireless network.

In some embodiments of the method 1400, the report data comprises an indication bit corresponding to a quality of a serving cell of the UE.

In some embodiments of the method 1400, the report data comprises an expected RRC state of the UE.

Embodiments contemplated herein include an apparatus comprising means to perform one or more elements of the method 1400. This apparatus may be, for example, an apparatus of a network node 1600 as described below.

Embodiments contemplated herein include one or more non-transitory computer-readable media comprising instructions to cause an electronic device, upon execution of the instructions by one or more processors of the electronic device, to perform one or more elements of the method 1400. This non-transitory computer-readable media may be, for example, the memory 1606 of the network node 1600 described below, and/or the peripheral devices 1704, the memory/storage devices 1714, and/or the databases 1720 of the components 1700 as described below.

Embodiments contemplated herein include an apparatus comprising logic, modules, or circuitry to perform one or more elements of the method 1400. This apparatus may be, for example, an apparatus of a network node 1600 as described below.

Embodiments contemplated herein include an apparatus comprising: one or more processors and one or more computer-readable media comprising instructions that, when executed by the one or more processors, cause the one or more processors to perform one or more elements of the method 1400. This apparatus may be, for example, an apparatus of a network node 1600 as described below.

Embodiments contemplated herein include a signal as described in or related to one or more elements of the method 1400.

Embodiments contemplated herein include a computer program comprising instructions, wherein execution of the program by a processing element is to cause the processing element to carry out one or more elements of the method 1400. These instructions may be, for example, the instructions 1712 of the components 1700 as described below.

Figure 15:
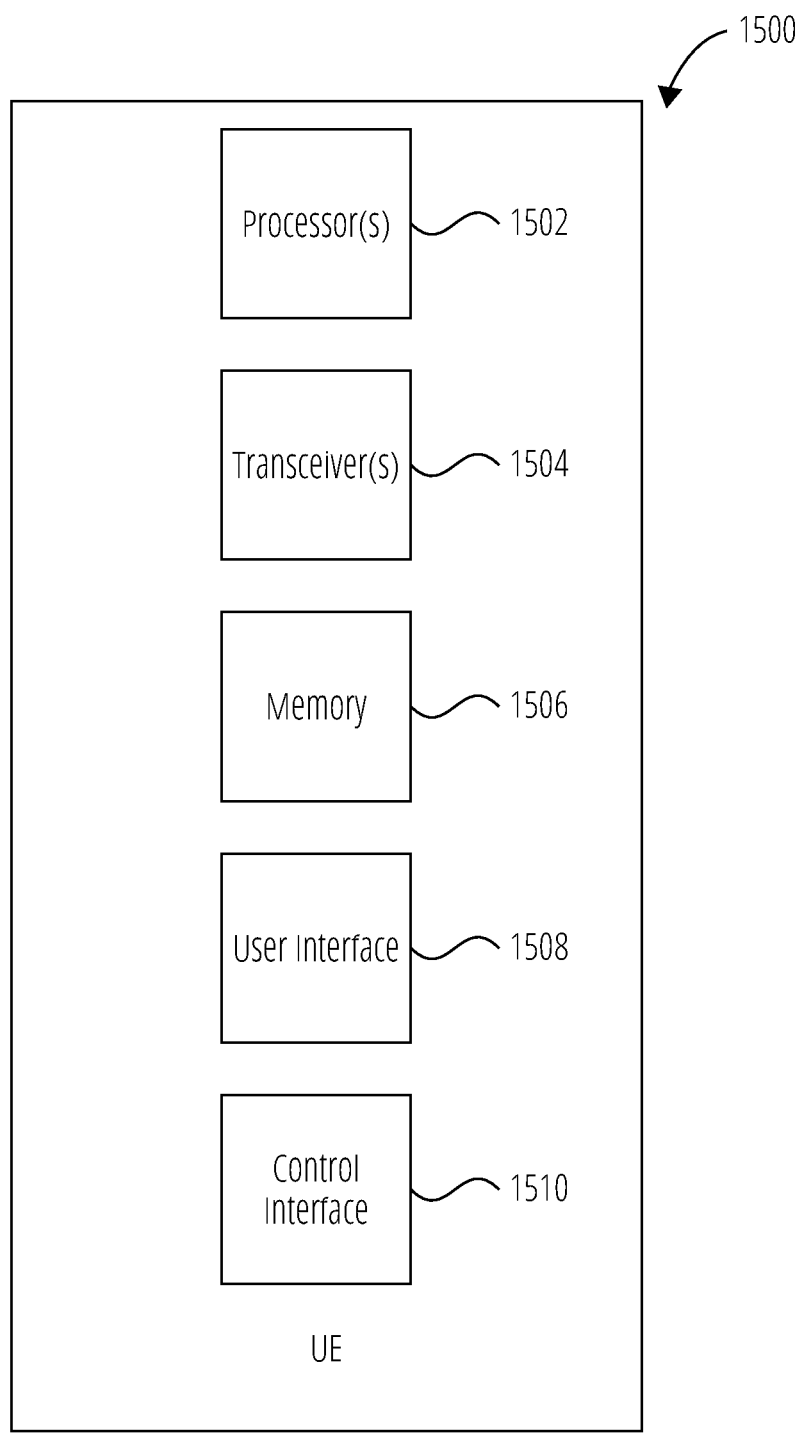
FIG. 15 illustrates a UE in accordance with one embodiment.

FIG. 15 is a block diagram of an example UE 1500 configurable according to various embodiments of the present disclosure, including by execution of instructions on a computer-readable medium that correspond to any of the example methods and/or procedures described herein. The UE 1500 comprises one or more processor 1502, transceiver 1504, memory 1506, user interface 1508, and control interface 1510.

The one or more processor 1502 may include, for example, an application processor, an audio digital signal processor, a central processing unit, and/or one or more baseband processors. Each of the one or more processor 1502 may include internal memory and/or may include interface(s) to communication with external memory (including the memory 1506). The internal or external memory can store software code, programs, and/or instructions for execution by the one or more processor 1502 to configure and/or facilitate the UE 1500 to perform various operations, including operations described herein. For example, execution of the instructions can configure the UE 1500 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 1504, user interface 1508, and/or control interface 1510. As another example, the one or more processor 1502 may execute program code stored in the memory 1506 or other memory that corresponds to MAC, RLC, PDCP, and RRC layer protocols standardized by 3GPP (e.g., for NR and/or LTE). As a further example, the processor 1502 may execute program code stored in the memory 1506 or other memory that, together with the one or more transceiver 1504, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 1506 may comprise memory area for the one or more processor 1502 to store variables used in protocols, configuration, control, and other functions of the UE 1500, including operations corresponding to, or comprising, any of the example methods and/or procedures described herein. Moreover, the memory 1506 may comprise non-volatile memory (e.g., flash memory), volatile memory (e.g., static or dynamic RAM), or a combination thereof. Furthermore, the memory 1506 may interface with a memory slot by which removable memory cards in one or more formats (e.g., SD Card, Memory Stick, Compact Flash, etc.) can be inserted and removed.

The one or more transceiver 1504 may include radio-frequency transmitter and/or receiver circuitry that facilitates the UE 1500 to communicate with other equipment supporting like wireless communication standards and/or protocols. For example, the one or more transceiver 1504 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 1502. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 1504 includes a transmitter and a receiver that enable UE 1500 to communicate with various 5G/NR networks according to various protocols and/or methods proposed for standardization by 3 GPP and/or other standards bodies. For example, such functionality can operate cooperatively with the one or more processor 1502 to implement a PHY layer based on OFDM, OFDMA, and/or SC-FDMA technologies, such as described herein with respect to other figures.

The user interface 1508 may take various forms depending on particular embodiments, or can be absent from the UE 1500. In some embodiments, the user interface 1508 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1500 may comprise a tablet computing device including a larger touchscreen display. In such embodiments, one or more of the mechanical features of the user interface 1508 may be replaced by comparable or functionally equivalent virtual user interface features (e.g., virtual keypad, virtual buttons, etc.) implemented using the touchscreen display, as familiar to persons of ordinary skill in the art. In other embodiments, the UE 1500 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 1500 having a touch screen display are capable of receiving user inputs, such as inputs related to exemplary methods and/or procedures described herein or otherwise known to persons of ordinary skill in the art.

In some exemplary embodiments of the present disclosure, the UE 1500 may include an orientation sensor, which can be used in various ways by features and functions of the UE 1500. For example, the UE 1500 can use outputs of the orientation sensor to determine when a user has changed the physical orientation of the UE 1500's touch screen display. An indication signal from the orientation sensor can be available to any application program executing on the UE 1500, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 1510 may take various forms depending on particular embodiments. For example, the control interface 1510 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 1510 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 1500 may include more functionality than is shown in FIG. 15 including, for example, a video and/or still-image camera, microphone, media player and/or recorder, etc. Moreover, the one or more transceiver 1504 may include circuitry for communication using additional radio-frequency communication standards including Bluetooth, GPS, and/or others. Moreover, the one or more processor 1502 may execute software code stored in the memory 1506 to control such additional functionality. For example, directional velocity and/or position estimates output from a GPS receiver can be available to any application program executing on the UE 1500, including various exemplary methods and/or computer-readable media according to various exemplary embodiments of the present disclosure.

Figure 16:
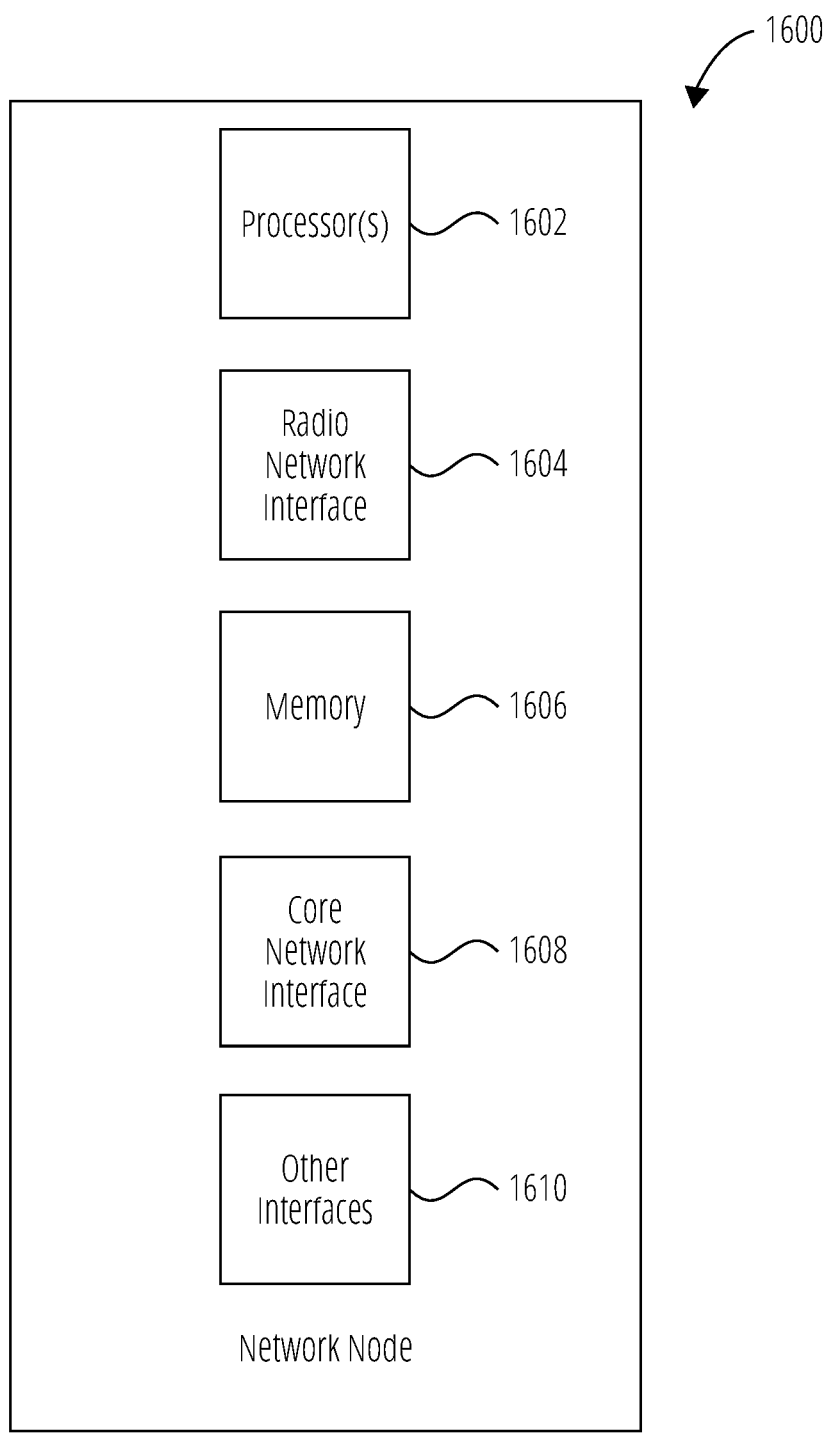
FIG. 16 illustrates a network node in accordance with one embodiment.

FIG. 16 is a block diagram of an example network node 1600 configurable according to various embodiments of the present disclosure, including by execution of instructions on a computer-readable medium that correspond to any of the example methods and/or procedures described herein.

The network node 1600 includes a one or more processor 1602, a radio network interface 1604, a memory 1606, a core network interface 1608, and other interfaces 1610. The network node 1600 may comprise, for example, a base station, eNB, gNB, access node, or component thereof.

The one or more processor 1602 may include any type of processor or processing circuitry and may be configured to perform any of the methods or procedures disclosed herein. The memory 1606 may store software code, programs, and/or instructions executed by the one or more processor 1602 to configure the network node 1600 to perform various operations, including operations described herein. For example, execution of such stored instructions can configure the network node 1600 to communicate with one or more other devices using protocols according to various embodiments of the present disclosure, including one or more methods and/or procedures discussed above. Furthermore, execution of such stored instructions can also configure and/or facilitate the network node 1600 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 1604 and the core network interface 1608. By way of example and without limitation, the core network interface 1608 comprise an S1 interface and the radio network interface 1604 may comprise a Uu interface, as standardized by 3GPP. The memory 1606 may also store variables used in protocols, configuration, control, and other functions of the network node 1600. As such, the memory 1606 may comprise non-volatile memory (e.g., flash memory, hard disk, etc.), volatile memory (e.g., static or dynamic RAM), network-based (e.g., "cloud") storage, or a combination thereof.

The radio network interface 1604 may include transmitters, receivers, signal processors, ASICs, antennas, beamforming units, and other circuitry that enables network node

1600 to communicate with other equipment such as, in some embodiments, a plurality of compatible user equipment (UE). In some embodiments, the network node 1600 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 1604 may include a PHY layer based on OFDM, OFDMA, and/or SC-FDMA technologies. In some embodiments, the functionality of such a PHY layer can be provided cooperatively by the radio network interface 1604 and the one or more processor 1602.

The core network interface 1608 may include transmitters, receivers, and other circuitry that enables the network node 1600 to communicate with other equipment in a core network such as, in some embodiments, circuit-switched (CS) and/or packet-switched Core (PS) networks. In some embodiments, the core network interface 1608 may include the S1 interface standardized by 3GPP. In some embodiments, the core network interface 1608 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 1608 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 1610 may include transmitters, receivers, and other circuitry that enables the network node 1600 to communicate with external networks, computers, databases, and the like for purposes of operations, administration, and maintenance of the network node 1600 or other network equipment operably connected thereto.

Figure 17:
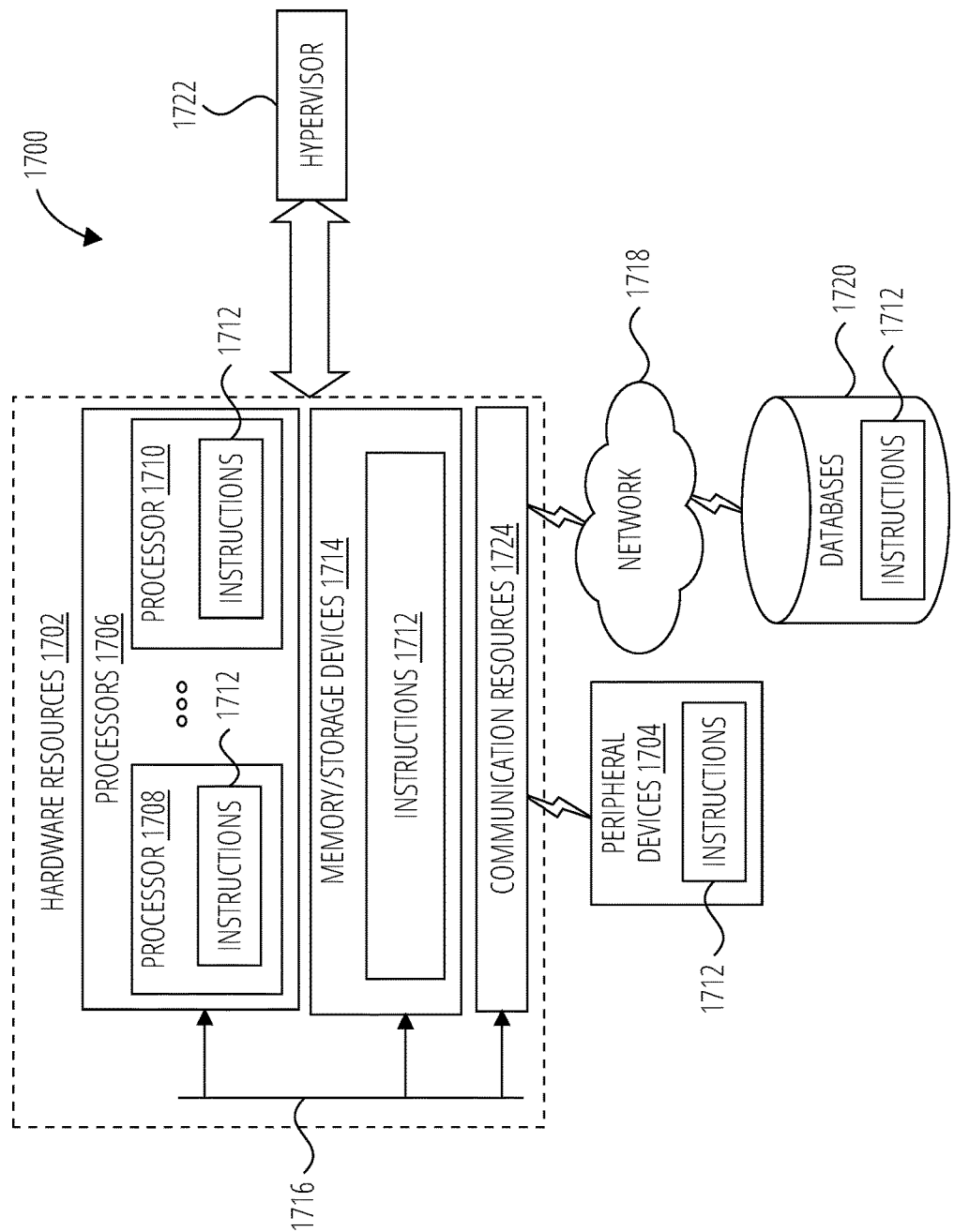
FIG. 17 illustrates components in accordance with one embodiment.

FIG. 17 is a block diagram illustrating components 1700, according to some example embodiments, able to read instructions from a machine-readable or computer-readable medium (e.g., a non-transitory machine-readable storage medium) and perform any one or more of the methodologies discussed herein. Specifically, FIG. 17 shows a diagrammatic representation of hardware resources 1702 including one or more processors 1706 (or processor cores), one or more memory/storage devices 1714, and one or more communication resources 1724, each of which may be communicatively coupled via a bus 1716. For embodiments where node virtualization (e.g., NFV) is utilized, a hypervisor 1722 may be executed to provide an execution environment for one or more network slices/sub-slices to utilize the hardware resources 1702.

The processors 1706 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1708 and a processor 1710.

The memory/storage devices 1714 may include main memory, disk storage, or any suitable combination thereof. The memory/storage devices 1714 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1724 may include interconnection or network interface components or other suitable devices to communicate with one or more peripheral devices 1704 or one or more databases 1720 via a network 1718. For example, the communication resources 1724 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1712 may comprise software, a program, an application, an applet, an app, or other executable code for causing at least any of the processors 1706 to perform any one or more of the methodologies discussed herein. The instructions 1712 may reside, completely or partially, within at least one of the processors 1706 (e.g., within the processor's cache memory), the memory/storage devices 1714, or any suitable combination thereof. Furthermore, any portion of the instructions 1712 may be transferred to the hardware resources 1702 from any combination of the peripheral devices 1704 or the databases 1720. Accordingly, the memory of the processors 1706, the memory/storage devices 1714, the peripheral devices 1704, and the databases 1720 are examples of computer-readable and machine-readable media.

For one or more embodiments, at least one of the components set forth in one or more of the preceding figures may be configured to perform one or more operations, techniques, processes, and/or methods as set forth herein. For example, the baseband circuitry as described above in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE), comprising:
    initiating, with a wireless network, a small data transmission (SDT) procedure; wherein the SDT procedure is performed while the UE is in an inactive state;
    performing, during an SDT measurement period of the SDT procedure, measurements of a plurality of cells of the wireless network;
    determining, during the SDT measurement period, respective qualities of the plurality of cells of the wireless network based on the measurements of the plurality of cells;
    detecting, during the SDT measurement period, a measurement event according to one or more of the respective qualities of the plurality of cells; and
    sending, in response to the detecting of the measurement event, one of an RRCResumeRequest message and an RRCReestablishmentRequest message.

2. The method of claim 1, wherein the plurality of cells comprises a serving cell of the UE and a neighbor cell of the plurality of cells.

3. The method of claim 1, wherein the measurement event is based on a quality of a serving cell of the plurality of cells.

4. The method of claim 3, wherein the measurement event is further based on a quality of a neighbor cell of the plurality of cells.

5. The method of claim 1, wherein the measurement event is based on radio link monitoring (RLM) of a serving cell of the plurality of cells.

6. The method of claim 1, wherein the SDT measurement period begins when a first message of an SDT random access channel (RACH) (SDT-RACH) procedure is sent by the UE.

7. The method of claim 1, wherein the SDT measurement period begins when an SDT random access channel (RACH) (SDT-RACH) procedure is successfully completed at the UE.

8. The method of claim 1, wherein the SDT measurement period begins when the UE receives an indication from the wireless network of dedicated grants to use after an SDT random access channel (RACH) (SDT-RACH) procedure.

9. The method of claim 1, wherein the SDT measurement period ends when the one of the RRCResumeRequest message and the RRCReestablishmentRequest message is sent.

10. The method of claim 1, wherein the measurements are performed during the SDT measurement period according to a paging cycle of the UE.

11. The method of claim 1, wherein the measurements are performed during the SDT measurement period according to a configuration, by the wireless network, for monitoring an SDT physical downlink control channel (PDCCH) (SDT-PDCCH).

12. The method of claim 1, wherein the measurements are performed during the SDT measurement period according to an SDT discontinuous reception (DRX) (SDT-DRX) cycle.

13. The method of claim 12, wherein the SDT-DRX cycle is configured at the UE by the wireless network.

14. The method of claim 1, wherein the measurements are performed during the SDT measurement period according to a SDT measurement cycle configured at the UE by the wireless network.

15. The method of claim 14, wherein the SDT measurement cycle is configured at the UE by the wireless network via one of an RRCRelease message and a system information block (SIB) of a serving cell of the plurality of cells.

16. A method of a wireless network, comprising:
    performing, with a user equipment (UE) in an inactive state, a small data transmission (SDT) procedure;
    receiving, from the UE, during the SDT procedure, a measurement report having report data; and
    scheduling, with the UE, one or more grants for the UE during the SDT procedure based on the report data of the measurement report.

17. The method of claim 16, wherein the report data comprises a quality of one or more cells of the wireless network.

18. The method of claim 16, wherein the report data comprises an indication bit corresponding to a quality of a serving cell of the UE.

19. The method of claim 16, wherein the report data comprises an expected radio resource control (RRC) state of the UE.

20. An apparatus of a user equipment (UE), comprising:
    one or more processors, and
    a memory storing instructions that, when executed by the one or more processors, configure the UE to:
        initiate, with a wireless network, a small data transmission (SDT) procedure;
    wherein the SDT procedure is performed while the UE is in an inactive state;
        perform, during an SDT measurement period of the SDT procedure, measurements of a plurality of cells of the wireless network;
        determine, during the SDT measurement period, respective qualities of the plurality of cells of the wireless network based on the measurements of the plurality of cells;
        detect, during the SDT measurement period, a measurement event according to one or more of the respective qualities of the plurality of cells; and
        send, in response to the detecting of the measurement event, one of an RRCResumeRequest message and an RRCReestablishmentRequest message.

* * * * *